United States Patent
Douglas

(10) Patent No.: US 12,143,531 B2
(45) Date of Patent: Nov. 12, 2024

(54) METHOD AND APPARATUS FOR THREAT IDENTIFICATION THROUGH ANALYSIS OF COMMUNICATIONS SIGNALING, EVENTS, AND PARTICIPANTS

(71) Applicant: Pindrop Security, Inc., Atlanta, GA (US)

(72) Inventor: Lance Douglas, Atlanta, GA (US)

(73) Assignee: Pindrop Security, Inc., Atlanta, GA (US)

(*) Notice: Subject to any disclaimer, the term of this patent is extended or adjusted under 35 U.S.C. 154(b) by 0 days.

(21) Appl. No.: 17/943,893

(22) Filed: Sep. 13, 2022

(65) Prior Publication Data

US 2023/0007120 A1    Jan. 5, 2023

Related U.S. Application Data

(63) Continuation of application No. 16/927,464, filed on Jul. 13, 2020, now Pat. No. 11,445,060, which is a
(Continued)

(51) Int. Cl.
*H04M 3/22* (2006.01)
*H04L 9/40* (2022.01)
(Continued)

(52) U.S. Cl.
CPC ....... *H04M 3/2281* (2013.01); *H04M 3/2254* (2013.01); *H04M 3/436* (2013.01);
(Continued)

(58) Field of Classification Search
CPC .. H04M 3/2281; H04M 3/2254; H04M 3/436; H04M 7/0078; H04M 7/0093;
(Continued)

(56) References Cited

U.S. PATENT DOCUMENTS 5,850,434 A    12/1998  Ardon
6,298,123 B1*  10/2001  Nolting ............... H04M 3/2281
                                                             379/112.01
(Continued)

FOREIGN PATENT DOCUMENTS

WO    WO-2010/025805 A1    3/2010
WO    WO-2018/026912 A1    2/2018

OTHER PUBLICATIONS

Canadian Office Action dated Mar. 27, 2019, issued in corresponding Canadian Application No. 3,032,817, 4 pages.
(Continued)

*Primary Examiner* — Binh Kien Tieu
(74) *Attorney, Agent, or Firm* — Foley & Lardner LLP

(57) ABSTRACT

Aspects of the invention determining a threat score of a call traversing a telecommunications network by leveraging the signaling used to originate, propagate and terminate the call. Outer-edge data utilized to originate the call may be analyzed against historical, or third party real-time data to determine the propensity of calls originating from those facilities to be categorized as a threat. Storing the outer edge data before the call is sent over the communications network permits such data to be preserved and not subjected to manipulations during traversal of the communications network. This allows identification of threat attempts based on the outer edge data from origination facilities, thereby allowing isolation of a compromised network facility that may or may not be known to be compromised by its respective network owner. Other aspects utilize inner edge data from an intermediate node of the communications network which may be analyzed against other inner edge data from other intermediate nodes and/or outer edge data.

20 Claims, 15 Drawing Sheets

Related U.S. Application Data continuation of application No. 16/522,450, filed on Jul. 25, 2019, now Pat. No. 10,715,656, which is a continuation of application No. 16/200,379, filed on Nov. 26, 2018, now Pat. No. 10,542,135, which is a continuation of application No. 15/666,917, filed on Aug. 2, 2017, now Pat. No. 10,142,463.

(60) Provisional application No. 62/370,105, filed on Aug. 2, 2016.

(51) Int. Cl.
  *H04M 3/436* (2006.01)
  *H04M 7/00* (2006.01)

(52) U.S. Cl.
  CPC .......... *H04L 63/00* (2013.01); *H04L 63/1408* (2013.01); *H04M 7/0078* (2013.01); *H04M 7/0093* (2013.01); *H04M 2203/6027* (2013.01); *H04M 2207/12* (2013.01); *H04Q 2213/13139* (2013.01); *H04Q 2213/13345* (2013.01); *H04Q 2213/13515* (2013.01)

(58) Field of Classification Search
  CPC ...... H04M 2203/6027; H04M 2207/12; H04L 63/00; H04L 63/1408; H04Q 2213/13139; H04Q 2213/13345; H04Q 2213/13515
  USPC .................................................. 379/142.05
  See application file for complete search history.

(56) References Cited

U.S. PATENT DOCUMENTS

| | | | |
|---|---|---|---|
| 6,515,968 B1 * | 2/2003 | Combar | H04L 41/024 |
| | | | 707/E17.107 |
| 6,542,588 B1 | 4/2003 | Mashinsky | |
| 6,804,331 B1 | 10/2004 | Vacek et al. | |
| 6,856,982 B1 | 2/2005 | Stevens et al. | |
| 7,627,108 B1 | 12/2009 | Enzmann et al. | |
| 8,102,988 B2 | 1/2012 | Gavillet et al. | |
| 8,185,930 B2 | 5/2012 | Alperovitch et al. | |
| 8,223,921 B2 | 7/2012 | Makarov et al. | |
| 8,223,927 B2 | 7/2012 | Di Serio et al. | |
| 8,270,588 B2 | 9/2012 | Schwartz | |
| 8,774,379 B1 | 7/2014 | Youngs et al. | |
| 9,001,985 B2 | 4/2015 | Cox et al. | |
| 9,154,516 B1 * | 10/2015 | Vaystikh | H04L 63/1425 |
| 9,258,430 B2 | 2/2016 | Pinault et al. | |
| 9,578,004 B2 | 2/2017 | Greenspan et al. | |
| 9,619,772 B1 | 4/2017 | Adogla et al. | |
| 9,680,846 B2 | 6/2017 | Haugsnes | |
| 9,699,305 B1 | 7/2017 | Compert et al. | |
| 9,699,660 B1 | 7/2017 | Blatt et al. | |
| 9,871,913 B1 | 1/2018 | Saitawdekar et al. | |
| 10,033,751 B2 | 7/2018 | Donnelly et al. | |
| 10,142,463 B2 | 11/2018 | Douglas | |
| 10,225,397 B2 | 3/2019 | Compert et al. | |
| 10,289,838 B2 | 5/2019 | Singla et al. | |
| 10,389,872 B1 | 8/2019 | Cox et al. | |
| 10,477,012 B2 | 11/2019 | Rao et al. | |
| 10,542,135 B2 | 1/2020 | Douglas | |
| 2003/0063731 A1 | 4/2003 | Woodring | |
| 2004/0044912 A1 | 3/2004 | Connary et al. | |
| 2007/0036314 A1 | 2/2007 | Kloberdans et al. | |
| 2007/0150773 A1 | 6/2007 | Srivastava | |
| 2008/0084975 A1 | 4/2008 | Schwartz | |
| 2008/0089503 A1 | 4/2008 | Crockett et al. | |
| 2010/0174784 A1 | 7/2010 | Levey et al. | |
| 2011/0026702 A1 | 2/2011 | Bot | |
| 2011/0239295 A1 | 9/2011 | Sorge et al. | |
| 2012/0254243 A1 | 10/2012 | Zeppenfeld et al. | |
| 2012/0294435 A1 | 11/2012 | Cox et al. | |
| 2013/0182835 A1 | 7/2013 | Ma et al. | |
| 2015/0142623 A1 | 5/2015 | Ferguson et al. | |
| 2016/0012471 A1 | 1/2016 | Fisher et al. | |
| 2016/0027055 A1 | 1/2016 | Dixon et al. | |
| 2016/0117466 A1 | 4/2016 | Singh | |
| 2016/0127553 A1 * | 5/2016 | McCormack | H04M 3/5191 |
| | | | 379/265.03 |
| 2016/0164890 A1 | 6/2016 | Haugsnes | |
| 2017/0353601 A1 | 12/2017 | Compert et al. | |
| 2019/0026754 A1 | 1/2019 | Miltonberger | |
| 2019/0260801 A1 | 8/2019 | Reddy et al. | |

OTHER PUBLICATIONS

Communication pursuant to Article 94(3) EPC issued in Application No. 17 752 229.9-1213 dated Dec. 6, 2019.
Communication pursuant to Article 94(3) EPC on EP 17752229.9 dated Dec. 6, 2019.
Final Office Action on U.S. Appl. No. 16/927,464 Dtd Sep. 7, 2021.
Foreign Search Report on EP 20209613.7 dated Mar. 3, 2021.
Information Disclosure Statement filed Mar. 6, 2020.
Information Disclosure Statement filed Apr. 24, 2019.
Information Disclosure Statement filed Jul. 3, 2018.
Information Disclosure Statement filed Jul. 25, 2019.
Information Disclosure Statement filed Aug. 2, 2017.
Information Disclosure Statement filed Nov. 26, 2018.
Information Disclosure Statement filed Nov. 27, 2017.
International Search Report and Written Opinion for corresponding application PCT/US2017/045090 dated Nov. 3, 2017.
Non-Final Office Action on U.S. Appl. No. 15/666,917 dated Feb. 28, 2018.
Non-Final Office Action on U.S. Appl. No. 16/200,379 dated Mar. 21, 2019.
Non-Final Office Action on U.S. Appl. No. 16/522,450 dated Jan. 27, 2020.
Non-Final Office Action on U.S. Appl. No. 16/927,464 Dtd Dec. 10, 2021.
Notice of Allowance on U.S. Appl. No. 15/666,917 dated Jul. 31, 2018.
Notice of Allowance on U.S. Appl. No. 16/200,379 dated Sep. 19, 2019.
Notice of Allowance on U.S. Appl. No. 16/522,450 dated Apr. 30, 2020.
Notice of Allowance on U.S. Appl. No. 16/927,464 Dtd May 10, 2022.
Notification of Transmittal of The International Preliminary Report on Patentability issued in International Application No. PCT/US2017/045090 dated Oct. 18, 2018.
US Office Action on U.S. Appl. No. 16/927,464 Dtd Apr. 7, 2021.
Written Opinion of the International Preliminary Examining Authority, mailed Jun. 21, 2018, issued in corresponding International Application No. PCT/US2017/045090, 5 pages.
Examiner's Requisition for Canadian App. 3,066,442 dated May 26, 2023 (3 pages).
Examiners Report on EPO Application 20209613.7 dated Jan. 13, 2023 (4 pages).

* cited by examiner

METHOD AND APPARATUS FOR THREAT IDENTIFICATION THROUGH ANALYSIS OF COMMUNICATIONS SIGNALING, EVENTS, AND PARTICIPANTS

CROSS-REFERENCE TO RELATED APPLICATIONS

This application is a continuation of U.S. patent application Ser. No. 16/927,464, filed Jul. 13, 2020, which is a continuation of U.S. patent application Ser. No. 16/522,450, now U.S. Pat. No. 10,715,656, filed Jul. 25, 2019, which is a continuation of U.S. patent application Ser. No. 16/200,379, now U.S. Pat. No. 10,542,135, filed Nov. 26, 2018, which is a continuation of U.S. patent application Ser. No. 15/666,917, now U.S. Pat. No. 10,142,463, filed Aug. 2, 2017, which claims domestic priority under 35 U.S.C. § 119(e) to U.S. Provisional Patent Application No. 62/370,105, filed Aug. 2, 2016, each of which is hereby incorporated by reference in its entirety.

BACKGROUND

Communications network signaling and corroborating events are able to provide, and/or be interrogated to isolate, indicators of the complex nature of a telephone call, caller, and/or caller intent. By monitoring the signaling, the authenticity of a telephone-call attempt may be determined.

SUMMARY

This specification describes technologies relating to the detection or identification of phone calls, callers, or devices which may be deemed a threat. More specifically, aspects of the present disclosure relate to identifying threats through analysis of communications signaling, events, and participants, especially with respect to telephone networks.

In general, one aspect of the subject matter described in this specification can be embodied in a computer-implemented method or an apparatus.

Aspects of the invention include a method of determining a threat score of a call traversing a telecommunications network, including: receiving, at a network application platform, a signal from originating carrier signaling facilities at an originating side of the call; storing the call's outer edge data; and analyzing the outer edge data against historical or real-time data to determine a threat score.

Further aspects of the invention include taking an action in response to the threat score wherein the action includes one or more of providing the threat score to the called party; informing a network owner or proxy thereof of a potentially compromised network; redirecting the call to a new destination, a high-skill agent, an IVR/VRU system for automated authentication, or voicemail; splitting off call audio to a recording, monitoring, or listening facility; or hanging-up on the caller.

Still further aspects include receiving, at the network application platform, a signal from a telecommunication network node at a terminating side of the call; storing updated outer edge data relating to the call which has at least partially traversed the telecommunications network; and analyzing the outer edge data with the updated outer edge data to determine the threat score.

Even further aspects include receiving, at the network application platform, a signal from an intermediate telecommunication network node; storing inner edge data relating to the call which has at least partially traversed the telecommunications network to the intermediate node; and analyzing the outer edge data against the inner edge data to determine the threat score.

Yet further aspects include wherein the signal from originating carrier signaling facilities at an originating side of the call is one or more of an SS7 request, MAP request, CAP request, or API.

In other embodiments, aspects include a method of determining a threat score of a call traversing a telecommunications network, including receiving, at a network application platform, a signal from carrier signaling facilities at a first intermediate node of the telecommunications network; storing the first inner edge data from the first intermediate node; receiving, at a network application platform, another signal from carrier signaling facilities at a second intermediate node of the telecommunications network; storing the second inner edge data from the first intermediate node; and analyzing the first inner edge data against the second inner edge data to determine a threat score.

Other aspects include taking an action in response to the threat score wherein the action includes one or more of providing the threat score to the called party; informing a network owner or proxy thereof of a potentially compromised network; redirecting the call to a new destination, a high-skill agent, an IVR/VRU system for automated authentication, or voicemail; splitting off call audio to a recording, monitoring, or listening facility; or hanging-up on the caller.

Yet further aspects include wherein the signals from carrier signaling facilities at an originating side of the call is one or more of an SS7 request, MAP request, CAP request, or API.

Another embodiment includes a telecommunications network application platform, including: a processor; a memory device storing instructions that, when implemented by the processor cause the processor to: receive, at the telecommunications network application platform, a signal from originating carrier signaling facilities at an originating side of the call; store the call's outer edge data; and analyze the outer edge data against historical or real-time data to determine a threat score.

Additional aspects include wherein the memory device stores additional instructions, that, when implemented by the processor cause the processor to: take an action in response to the threat score wherein the action includes one or more of providing the threat score to the called party; informing a network owner or proxy thereof of a potentially compromised network; redirecting the call to a new destination, a high-skill agent, an IVR/VRU system for automated authentication, or voicemail; splitting off call audio to a recording, monitoring, or listening facility; or hanging-up on the caller.

Still other aspects include wherein the memory device stores additional instructions, that, when implemented by the processor cause the processor to receive, at the telecommunications network application platform, a signal from a telecommunication network node at a terminating side of the call; store updated outer edge data relating to the call which has at least partially traversed the telecommunications network; and analyze the outer edge data with the updated outer edge data to determine the threat score.

Another aspect include wherein the memory device stores additional instructions, that, when implemented by the processor cause the processor to: receive, at the network application platform, a signal from an intermediate telecommunication network node; store inner edge data relating to the call which has at least partially traversed the telecommunications network to the intermediate node; and analyze the outer edge data against the inner edge data to determine the threat score.

Still further aspects include wherein the signal from originating carrier signaling facilities at an originating side of the call is one or more of an SS7 request, MAP request, CAP request, or API.

Further embodiments include a telecommunications network application platform, comprising: a processor; a memory device storing instructions that, when implemented by the processor cause the processor to: receive, at a network application platform, a signal from carrier signaling facilities at a first intermediate node of the telecommunications network; store the first inner edge data from the first intermediate node; receive, at a network application platform, another signal from carrier signaling facilities at a second intermediate node of the telecommunications network; store the second inner edge data from the first intermediate node; and analyze the first inner edge data against the second inner edge data to determine a threat score.

Other aspects include wherein the memory device stores additional instructions, that, when implemented by the processor cause the processor to take an action in response to the threat score wherein the action includes one or more of providing the threat score to the called party; informing a network owner or proxy thereof of a potentially compromised network; redirecting the call to a new destination, a high-skill agent, an IVR/VRU system for automated authentication, or voicemail; splitting off call audio to a recording, monitoring, or listening facility; or hanging-up on the caller.

Further aspects include wherein the signals from carrier signaling facilities at an originating side of the call is one or more of an SS7 request, MAP request, CAP request, or API.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 5 may be read in conjunction with FIG. 7 or FIG. 8.

FIG. 7 may be read in conjunction with FIG. 5 and as an alternative to FIG. 8.

FIG. 8 may be read in conjunction with FIG. 5 and as an alternative to FIG. 7.

DETAILED DESCRIPTION

Figure 1:
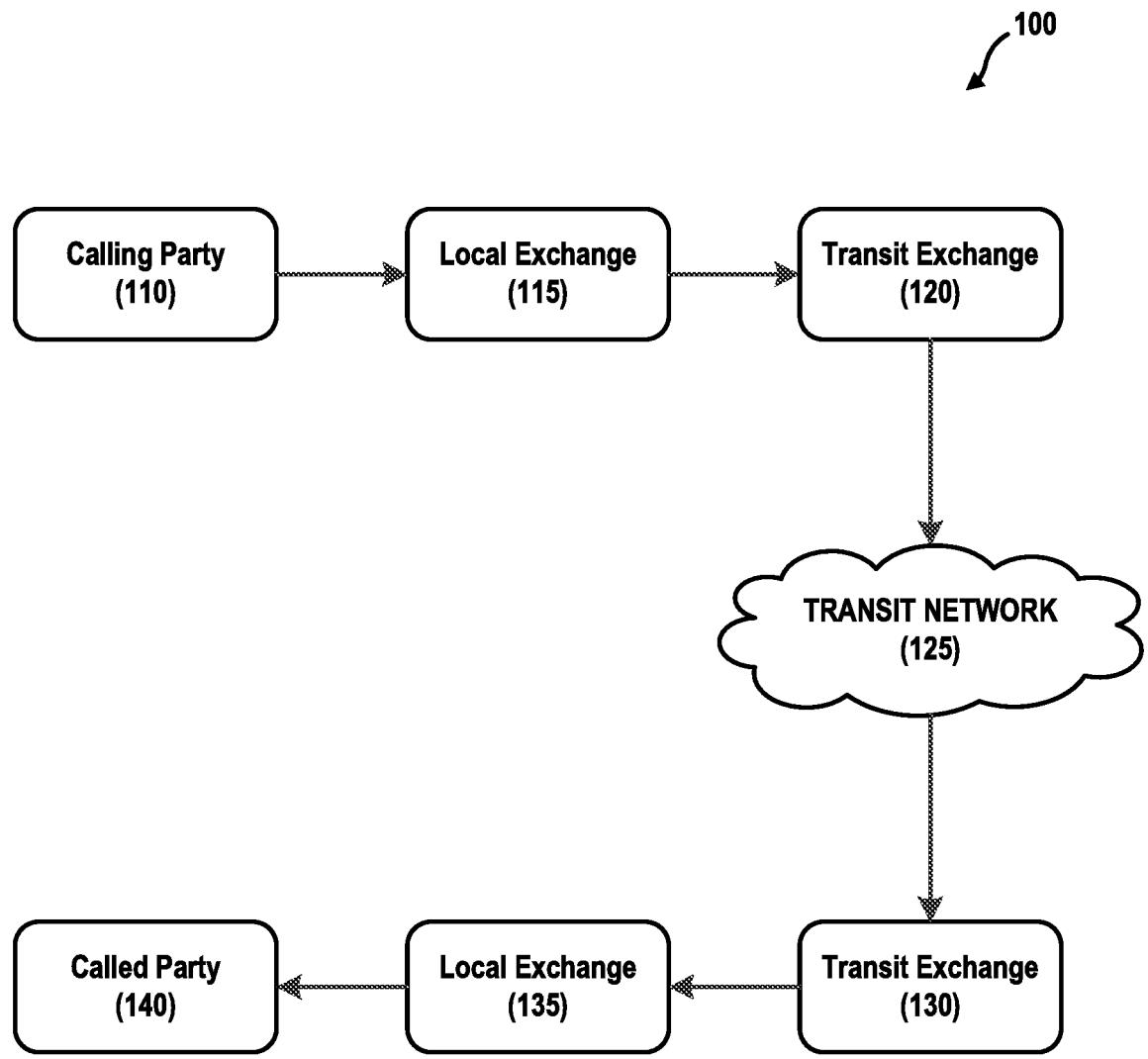
FIG. 1 is a block diagram illustrating a path of a telephone call according to conventional technology.

Telephone signaling has evolved over the past forty years and relates specifically to the intercommunication between systems responsible for enabling, routing, and monitoring local and international telephone calls. This signaling began as audible tones sent along with the voice media (in-band signaling) and has become nearly entirely separated from the audible portion of a call (out-of-band signaling).

There are several formal signaling recommendations, loosely called standards, which define the message structure, content, and interfaces that signaling systems can rely on to properly operate within the global communications networks. Predominantly, the two sets of recommendations used today are ITU-T's Q.700 series, globally, and as standardized by ANSI in North America. The signaling in fixed/wireline and mobile are similar, and mobile signaling has better standardization globally as interoperability for roaming and billing was paramount to its maturity.

As per ITU-T Q.1200 series (Fixed networks—INAP CS2) and CAMEL (Mobile networks—CAP), communications signaling is able to be routed to a Service Control Point (SCP) from the Service Switching Point (SSP) or Mobile Switching Center (MSC), whereas the SSP/MSC is the initial (originating) and final (terminating) telephony facility nodes responsible for enabling a telephone call. Due to the complexity of the myriad network standards implementations in the fixed-line systems, signaling is based on a hand-off from one network node to the next along the way to the predefined destination SSP/MSC, with neither regard to nor certain knowledge about the previous or pending participating nodes.

This node-hopping approach is great at allowing for disparate networks to work independently for a call to cooperatively traverse their networks, regardless of the previous network participant and any pending participating network. However, this node-hopping also allows a caller's identity to be obfuscated due to lack of true origination, or total route taken, information being available; lack of authorization-verification of the information provided by the calling party (e.g. the caller's phone number is not validated for authorized usage by the calling party or their device); and lack of reliability that any validating information provided in the signaling, at any point in the call, will not be deleted or manipulated by any other point in the call prior to the destination SSP/MSC.

Since billing is the one core business function that all networks implement, the most mature aspect of the signaling networks is the billing integration at call origination and similar services such as re-routing (e.g. freephone 800 numbers, voicemail). Moreover, mobile networks, due to the nomadic nature of the devices used to expose billable subscribers to the network services, have had the opportunity to be significantly more mature in the areas of billing control and the standardization of billing interoperability.

While the billing systems of each network may be the most mature functions, they are typically the least exposed to other networks for interrogation, corroboration, or collaboration regarding the validity of the information provided, or not provided, in the call signaling messages. Thus there is a real potential for threats to exist from parties that are able to hide behind networks that have either fallen victim to unauthorized origination of a call with false data or that are known to remove identifying information when used as one of the potentially hundreds of nodes participating to deliver a telephone call to its destination.

In one embodiment of the invention, details and statistics about the SSP/MSC utilized to originate the call (aka "outer-edge data") are compared with historical, or third party real-time data, to determine the propensity of calls originating from those facilities to be categorized as a threat. Storing the outer edge data before the call is sent over the communications network permits such data to be preserved and not subjected to manipulations during traversal of the communications network. This allows identification of threat attempts based on the outer edge data from origination facilities, thereby allowing isolation of a compromised network facility that may or may not be known to be compromised by its respective network owner. The result of this embodiment allows for various actions to be taken such as the following: protection of called parties from obvious and potential threats before the call terminates within their network; informing of network owners of compromised network facilities; the informing of law enforcement and regulatory bodies of threat activity; and/or isolation of network traffic originating from a compromised network facility to further enrich threat detection capabilities. Other actions which may be taken include dynamic or pre-determined actions such as redirecting the telephone call to a new destination, such as high-skill agent, an IVR/VRU system for automated authentication, or voicemail; splitting off the audio to a recording, monitoring, or listening facility; and/or hanging-up on the caller.

In another embodiment of the invention, analysis of the variance (ANOVA) of the accuracy of the details, of the caller and its device from the perspectives of the SSP/MSC utilized to originate the call and the SSP/MSC utilized to terminate the call are compared to identify the threat potential. This allows identification of variance between the data supplied from the less-trusted origination network facilities and the, potentially, more trusted termination network facilities. Through this variance it may be determined that information was either provided incorrectly via the origination network, and/or modified, or removed, while in-transit to the termination network. With further interrogation of network owners' systems, regulators' databases, and/or data-systems malicious variances may be isolated from the benign.

In another embodiment of the invention, International Mobile Equipment Identifier (IMEI), or equipment identifier, is tracked across calls as well as compared in real-time, or post-call, against third party data to determine threat levels. By tracking devices used across disparate calls and third party systems, validity of information supplied regarding the device of the caller may be assessed. With this information, statistical information about the usage of the device can be determined, and outliers such as time of day, repeat calling, location anomalies, and ownership status may be identified, thereby allowing protection of called parties, and their callers, from threat attempts made on the latter's devices or behalf. Additionally, by knowing the device type, internal and third party systems may be further interrogated for relevant data which may be matched against that device type.

In another embodiment of the invention, the International Mobile Subscriber Identifier (IMSI), or subscriber identifier, is tracked across calls as well as validated against the presumed responsible carrier. This information may be requested by trusted networks. By knowing the unique subscriber identifier, internal and third party systems may be interrogated for relevant corroborating information against the accuracy of the data provided in the call by the signaling as well as the caller. For example, signaling data may indicate that the call is originating from a MSC that is serving base stations in northeastern Atlanta, Georgia, but the IMSI is used to interrogate the subscriber's carrier network to determine the subscriber is currently not in call and is attached to a MSC serving base stations in Reno, Nevada; with this information exposed to the call-center agent, which the phone call is directed to, the agent can see the conflicting information and casually ask the caller where they are calling from to determine corroboration, or further variance, and act accordingly.

In another embodiment of the invention, a combination of IMEI and IMSI may be tracked to isolate obfuscation attempts of one call by a subscriber and/or device from a valid call by that same subscriber or device, allowing for the true identification of at least one participant in a threat attempt. With these two pieces of data available for some or all of the calls monitored as described herein, internal and third party real-time, historical, and caller-authentication information can be used to determine if the device and/or subscriber is part of an organized group perpetrating threats. For example, many "burner phones" may be used during an organized attack against victims across multiple channels such as email, phone, chat, and social messaging. By collecting and analyzing this data combination when available, both new and growing fraud rings, as well as false positives, may be identified. A good example is the case where a burner phone is used multiple times but with new subscriber identification module (SIM) cards. It may be determined that for a confirmed threat attempt, each SIM card that was ever used in the device is suspect, as is any future device in which the SIM card is used. Additionally, any appearance of a "valid" utilization of any portion of a suspected combination anytime between mismatched IMEI and IMSI threat attempts may be monitored, to uncover the real identity of a SIM card owner in possession of a fraud-suspected device, or vice-versa.

The systems and methods described herein may be used during remaining portions of the call to more thoroughly detect the alleged threat, and additional information may be gathered. Further, media or law-enforcement may be involved.

Customized SCP functionality may be utilized to manage full signaling control of a portion of the call. The device, subscriber, content, and/or third party events may be analyzed to determine the potential for multi-call threat identification.

Signaling control may be routed to a dynamic signaling control system during call setup, prior to either party hearing ringing. The signaling control may be used to authenticate, authorize, and monitor both the communications signaling and media to provide any of the following: enhanced billing services, in conjunction with the explained invention; validation of the information supplied in a single call to assess the possibility of a malicious call; and/or analysis of the patterns and information supplied across multiple disparate calls—and non-call derived events—from multiple points in the call beyond just call-setup.

FIG. 1 is a diagram illustrating a path 100 of a typical telephone call in the conventional art. Calling party 110 places a call which is handled by the local exchange 115. The call then arrives at a transit exchange 120 and passes through the transit network 125. Toward the terminating end of the call's path, the call proceeds to transit exchange 130 and then to local exchange 135. Eventually, the call reaches the called party 140.

Figure 2:
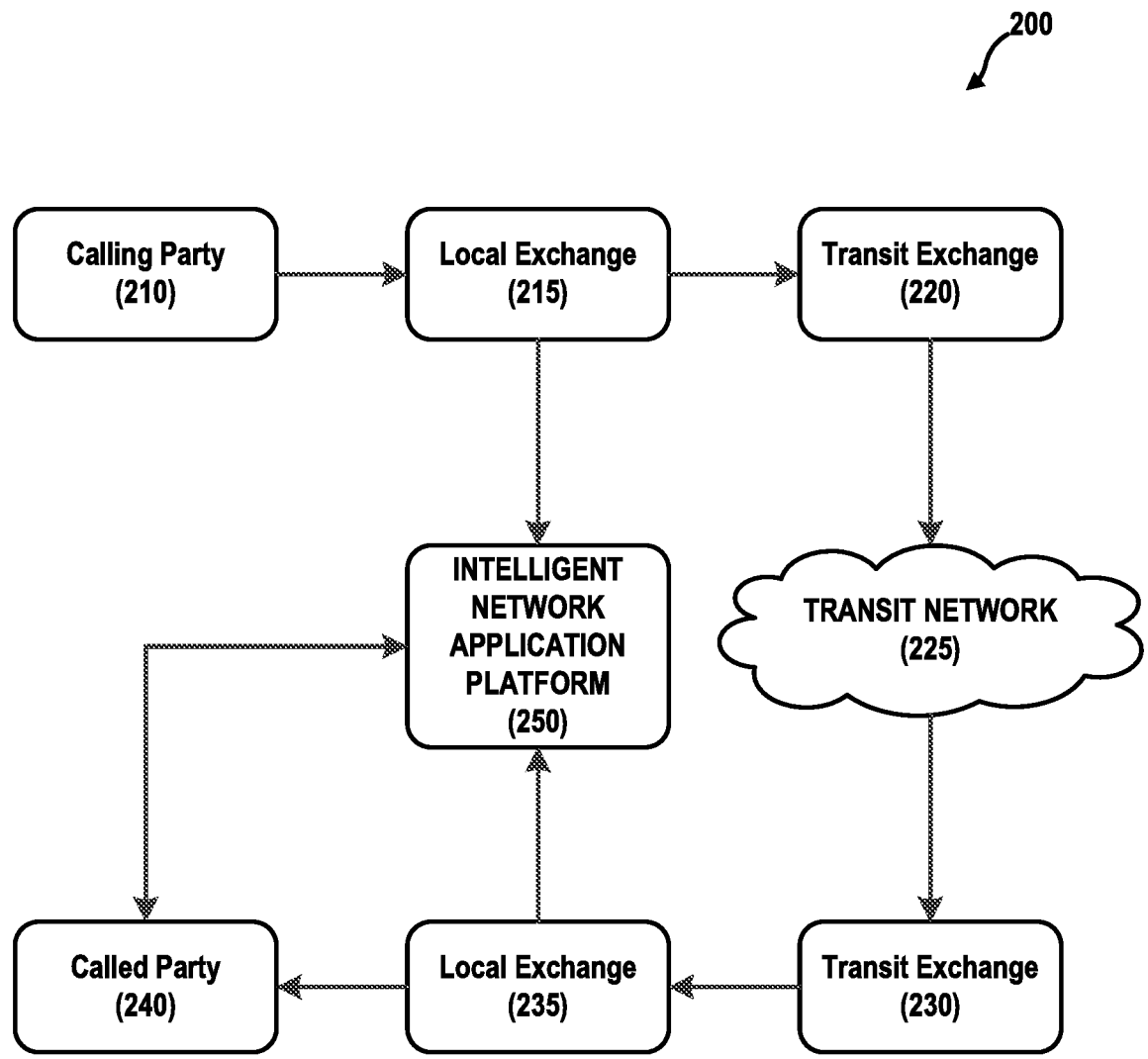
FIG. 2 is a block diagram illustrating a path of a telephone call including an intelligent network application platform in accordance with one or more embodiments of the present invention.

FIG. 2 is a diagram illustrating a path 200 of a telephone call, wherein the path includes an intelligent network application platform 250 in accordance with one or more embodiments of the present invention. Calling party 210 places a call which is handled by the local exchange 215 on the originating end. Local exchange 215 sends a trigger to the intelligent network application platform 250 and routes the call to the transit exchange 220. The call then proceeds through transit network 225 to transit exchange 230 and then to the local exchange 235 on the terminating end. Local exchange 235 sends a trigger to the intelligent network application platform 250 and routes the call to the called party 240. Meanwhile, intelligent network application platform 250 exchanges information with called party 240.

Figure 3:
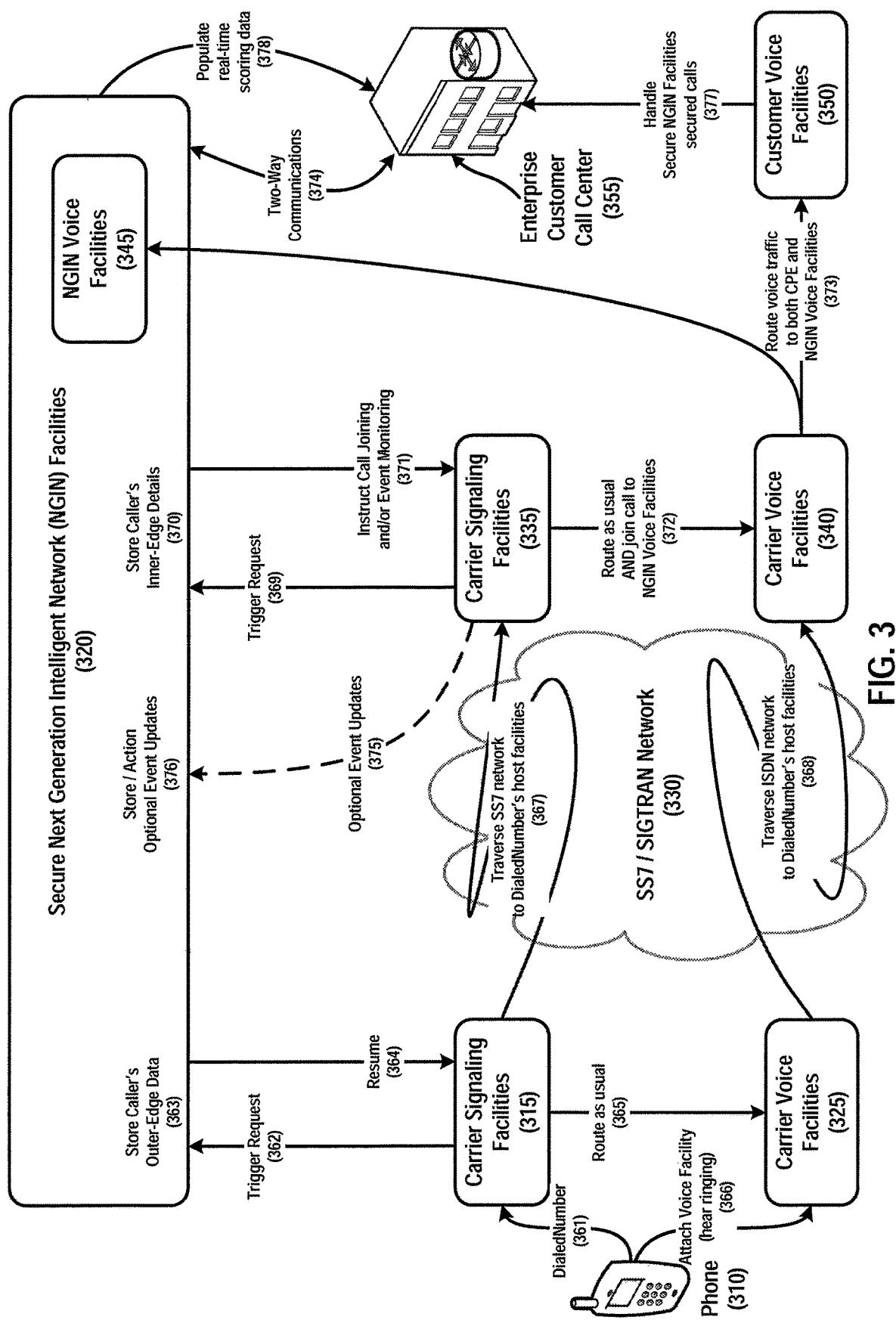
FIG. 3 is a block diagram illustrating a path of a telephone call including secure next generation intelligent network facilities in accordance with one or more embodiments of the present invention.

FIG. 3 is a diagram illustrating a path of a telephone call including secure next generation intelligent network (NGIN) facilities 320 in accordance with one or more embodiments of the present invention. FIG. 3 includes a phone 310, carrier signaling facilities 315 on the originating side of the call, secure next generation intelligent network (NGIN) facilities 320, carrier voice facilities 325 on the originating side of the call, Signaling System 7 (SS7)/signaling transport (SIGTRAN) network 330, carrier signaling facilities 335 on the terminating side of the call, carrier voice facilities 340 on the terminating side of the call, NGIN voice facilities 345, customer voice facilities 350, and enterprise customer call center 355.

While the phone 310 is depicted as a smartphone, the embodiments are not limited thereto. For example and without limitation, the phone 310 could be a rotary dial phone, a touchtone phone, a landline phone, a cellular phone, a voice over Internet Protocol (VoIP phone), or a softphone. Further, the phone 310 could be any type of phone including those capable of producing dual-tone multi-frequency signaling (DTMF) tones.

An example call path involving secure NGIN facilities 320 will now be set forth in accordance with one or more embodiments of the present invention. A DialedNumber 361 is dialed on a phone 310. Carrier signaling facilities 315 on the originating side of the call send a trigger request 362 to the secure NGIN facilities 320. In response to the trigger 362, the secure NGIN facilities 320 store the caller's outer-edge data 363. The caller's outer-edge data may comprise connection signaling and/or metadata, and the connection signaling and/or metadata may include identity determination information. The connection signaling includes everything provided from the SSF/SSP to the SCF/SCP, metadata includes specific items within that signaling that refers to other information requiring relative information in other systems for further data acquisition.

For example, a LocationNumber and Terminal Type, both of which are not required for connection signaling from end-to-end, may be provided by the SSF/SSP and the Location Number is specific to a combination of Service Provider and TerminalType meaning that it would be necessary to perform a lookup in a Service Provider supplied resource to correlate those pieces of data into useful information.

Example outer edge data include the following:
CalledPartyNumber
CallingPartyBusinessGroupID
CallingPartySubaddress
FacilityGroup
FacilityGroupMember
OriginalCalledPartyID
Digits
RedirectingPartyID
RedirectionInformation
RouteList
TravellingClassMark
Extensions
FeatureCode
AccessCode
Carrier
ComponentType
Component
ComponentCorrelationID
ServiceAddressInformation
LocationNumber
TerminalType
Extensions
USIServiceIndicator
USIInformation
CUApplicationInd
HighLayerCompatibility
BearerCapability
GenericNumbers Thereafter, the secure NGIN facilities 320 send a resume message 364 to the carrier signaling facilities 315 on the originating side, which then send a message to the carrier voice facilities 325 on the originating side to route the call as usual 365. The carrier voice facilities 325 on the originating side then attach voice facility 366 to the phone 310, causing the caller to hear ringing from the phone 310.

Call signaling then traverses 367 the SS7 network to DialedNumber's host facilities, and call media traverses 368 an integrated services digital network (ISDN) to DialedNumber's host facilities. Once call signaling has reached carrier signaling facilities 335 on the terminating side of the call, the carrier signaling facilities 335 send a trigger request 369 to the secure NGIN facilities 320, which store the caller's inner-edge details 370.

The inner-edge details may include some or all of the outer-edge data that is relative to the connectivity (e.g. Original Called Party—if capable of forwarding and data is maintained, Calling Party Address, Location), but only a Called Party Address guaranteed to be provided, and not necessarily the Original Called Party Address. The variance, itself, is one method of indicating-information in the inventive modeling and analysis.

The secure NGIN facilities 320 then instruct call joining and/or event monitoring via message 371 to carrier signaling facilities 335 on the terminating side. Carrier signaling facilities 335 on the terminating side then send a message 372 to the carrier voice facilities 340 on the terminating side to route the call as usual and join the call to NGIN voice facilities 345. The carrier voice facilities 340 on the terminating side then route 373 the voice traffic to both customer premises equipment (CPE) and the secure NGIN facilities 320. Two-way communications 374 are established between the secure NGIN facilities 320 and the enterprise customer call center 355. Optional event updates 375 may be sent by the carrier signaling facilities 335 on the terminating side to the secure NGIN facilities 320, which then stores or takes action 376 on the optional event updates. Customer voice facilities 350 on the terminating side prompt 377 enterprise customer call center 355 to handle calls secured by the secure NGIN facilities 320. The secure NGIN facilities 320 populate real-time scoring data 378 to the enterprise customer call center 355.

Figure 4:
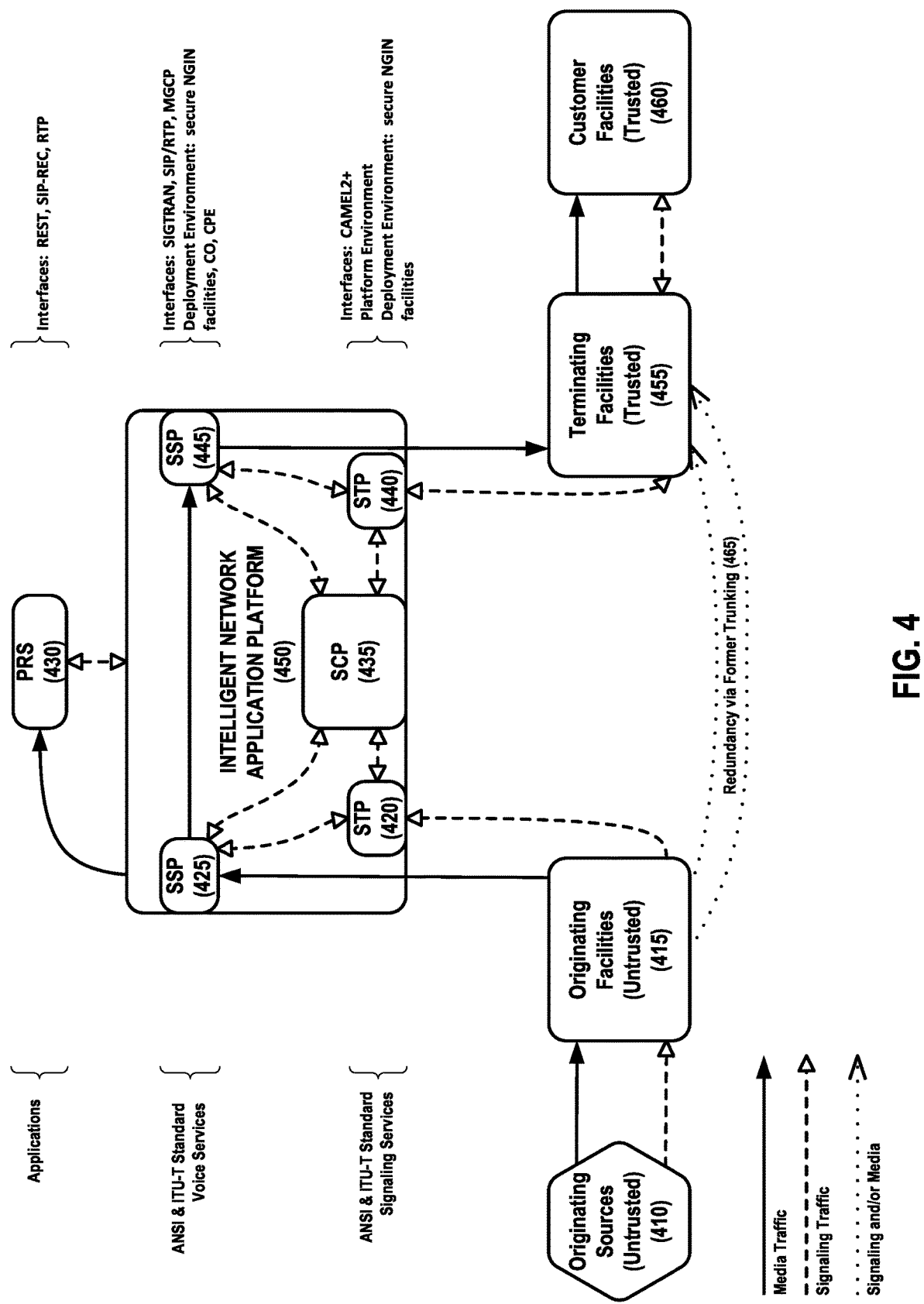
FIG. 4 is a block diagram illustrating an intelligent network application platform and a path of a telephone call in accordance with one or more embodiments of the present invention.

FIG. 4 is a diagram illustrating an intelligent network application platform and a path of a telephone call in accordance with one or more embodiments of the present invention. Included in FIG. 4 is an intelligent network application platform 450 which comprises a signal transfer point (STP) 420 on the originating side of the call, a service switching point (SSP) 425 on the originating side of the call, a service control point (SCP) 435, a STP 440 on the terminating side of the call, and a SSP 445 on the terminating side of the call.

Call media and signaling traffic proceed from originating sources 410 to originating facilities 415. Both originating sources 410 and originating facilities 415 may be untrusted. Call media traffic then proceeds from the originating facilities 415 to the SSP 425 on the originating side of the call. Call signaling traffic proceeds from the originating facilities 415 to the intelligent network application platform 450, where the call signaling traffic may be received by the STP 420. The STP 420 routes signaling traffic between the SCP 435 and the SSP 425 on the originating side. The SCP 435 and the SSP 425 on the originating side may exchange messages directly. The STP 420 may route signaling traffic to and from the originating facilities 415.

The intelligent network application platform 450 routes call media traffic to a premium rate service (PRS) 430. The PRS 430 exchanges signaling traffic with the intelligent network application platform 450. The PRS may have an interface specified in representational state transfer (REST) style; functionality for recording a Session Initiation Protocol (SIP) session (SIP-REC); and/or logic to receive and send Real-time Transport Protocol (RTP) packets and codec(s) for the RTP packets' contents.

Call media traffic proceeds from the SSP 425 on the originating side to the SSP 445 on the terminating side. The SSP 445 on the terminating side may exchange signaling traffic with the SCP 435. A STP 440 on the terminating side may route signaling traffic between the SSP 445 and the SCP 435. Terminating facilities 455 exchange signaling traffic with the intelligent network application platform 450. The STP 440 may route signaling traffic to and from the terminating facilities 455. Call media traffic proceeds from the SSP 445 to the terminating facilities 455 and then to the customer facilities 460. The terminating facilities 455 and the customer facilities 460 exchange signaling traffic. The terminating facilities 455 and the customer facilities 460 may be trusted.

The SSPs 425 and 445 may have an interface for SS7/ISDN/SIGTRAN signaling protocols, SIP and RTP, and/or Media Gateway Control Protocol (MGCP). SSPs 425 and 445 may be deployed in a central office/local exchange, as customer premises equipment, or as part of the secure NGIN facilities 320.

The STPs 420 and 440 may have an interface for Customized Applications for Mobile Networks Enhanced Logic (CAMEL) phase 2 or above and/or Intelligent Network Application Protocol (INAP). STPs 420 and 440 may be deployed as part of the secure NGIN facilities 320.

In addition to the matter in FIG. 4 heretofore described, pre-existing trunking between the originating facilities 415 and the terminating facilities 455 may be a redundant path 465 taken by signaling and/or media traffic.

Figure 5:
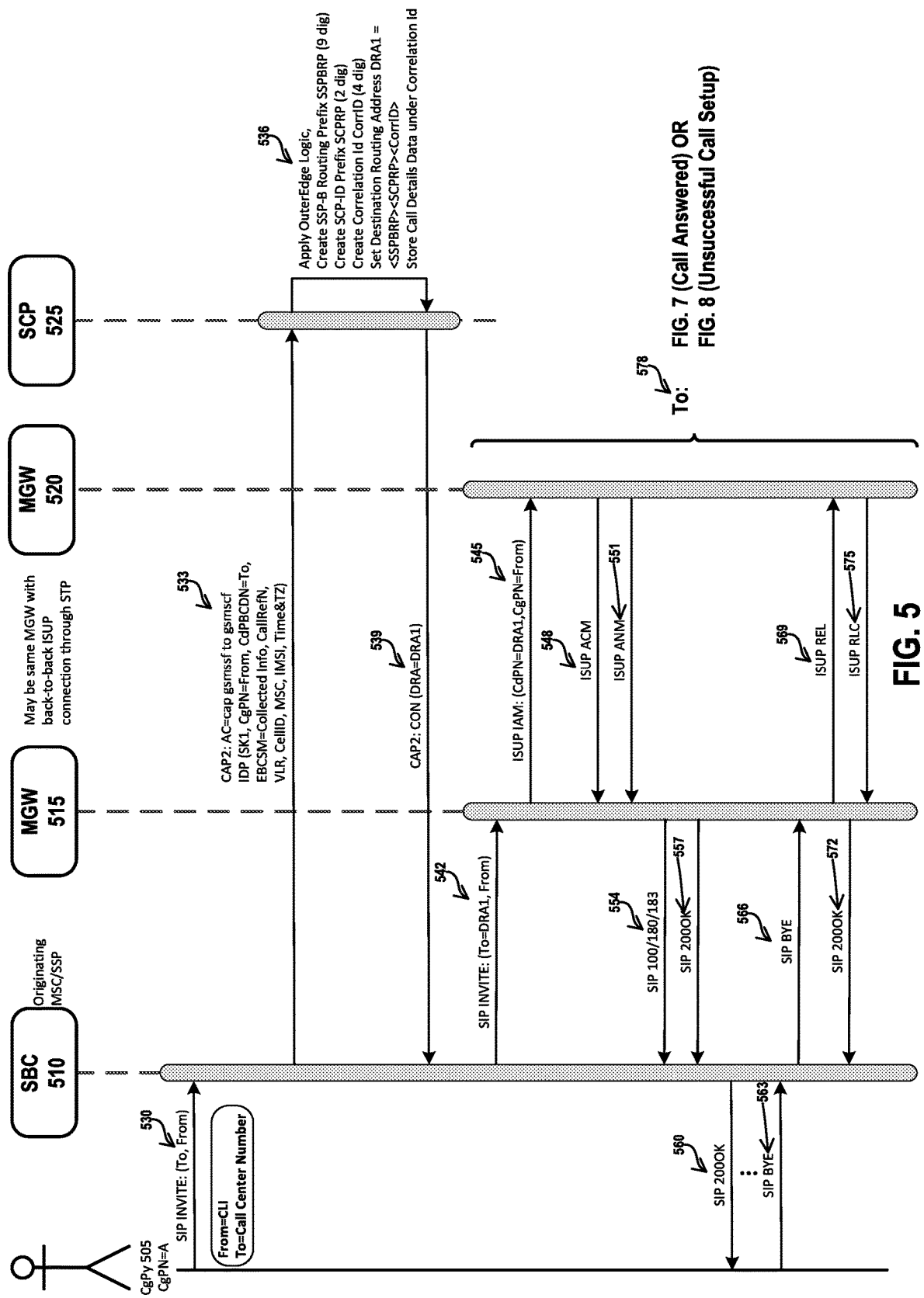
FIG. 5 is a diagram illustrating a portion of a call flow according to one or more embodiments of the present invention.

FIG. 5 is a diagram illustrating a portion of a call flow according to one or more embodiments of the present invention. FIG. 5 may be read in conjunction with FIG. 7 or FIG. 8. FIG. 5 includes calling party 505, session border controller (SBC) 510, media gateway (MGW) 515, MGW 520, and SCP 525. SBC 510 may be an originating MSC or SSP, depending on the nature of the call. MGWs 515 and 520 may be the same or similar equipment and may be implemented in the form of Cisco AS5400 Series Universal Gateway(s). MGWs 515 and 520 may have a back-to-back ISDN user part (ISUP) connection through a STP.

The following is a description of an example call flow according to one or more embodiments of the present invention. Other call flows are possible. The phone of calling party 505 sends a SIP INVITE request 530 to SBC 510 including the calling party/client (CLI (Calling Line Identification)) in a From header field and the call center's 705/805 phone number in a To header field.

In the case that the calling party's 505 phone is a mobile phone, SBC 510 then sends a CAMEL Application Part (CAP) request 533 having, for example and without limitation, application context (AC) of Global System for Mobile Communications (GSM) service switching function (SSF) to GSM service control function (SCF) and initial detection point (IDP) with relevant parameters. Example relevant IDP parameters may include and are not limited to the following: SK1 (ServiceKeyN (where n is an arbitrary but implementation-specific id—in more detail this parameter is used when communicating with an SCF/SCP and the ServiceKeyNumber is simply an id to correlate what the SSF/SSP is asking the SSF/SCP to perform), calling party number (CgPN), CdPBCDN(Called party binary coded decimal number, original dialed digits before Call Deviation)), and BCSM DP (detection point), including parameters such as collected info, CallRefN (a unique identifier for the call—this parameter gives the network call reference number assigned to the call by the GMSC/MSC), visitor location register (VLR), CellID (location marker of the cellular area/tower which the caller's device (IMEI) is attached to), CID (A GSM Cell ID (CID) is a generally unique number used to identify each base transceiver station (BTS) or sector of a BTS within a location area code (LAC) if not within a GSM network)), MSC, IMSI, and time and time zone.

Upon receipt of CAP request 533, SCP 525 takes action 536 as follows. A routing prefix for SSP-B and a correlation identifier (ID) are created. In more detail, SSP-B is the inner-edge SSP (the one answering the call). SSP-A sends the call signaling to the NGIN 320 and the NGIN 320 redirects the call by changing the called party, or updates the calling party number to a unique-in-time number such that when the NGIN 320 is later queried mid-network or at SSP-B, the changes act as unique identifiers for that call and all other inner/outer data can be analyzed. A destination routing address DRA1 comprising the SSP-B routing prefix, a routing prefix for SCP, and a correlation ID for the call is set. Call details data are keyed to the correlation ID and stored. SCP 525 then sends a CON message 539 with a parameter of DRA1.

SBC 510 sends a SIP INVITE request 542 with parameter DRA1 to MGW 515 which sends an ISUP initial address message (IAM) 545 with parameters DRA1 and the calling party's number to MGW 520. MGW 520 responds to MGW 515 with ISUP address complete message (ACM) 548 and, subsequently, ISUP answer message (ANm) 551. MGW 515 sends SIP response codes (reference number 554) 100, 180, or 183, as appropriate, and eventually SIP 200 OK (reference number 557), to SBC 510. SBC 510 sends SIP 200 OK response code 560 to calling party's 505 phone. At the end of calling party's 505 call, calling party's 505 phone sends a SIP BYE request 563 to SBC 510, which passes the SIP BYE request 566 to MGW 515. MGW 515 signals MGW 520 with ISUP REL request 569. MGW 520 responds to MGW 515 with ISUP RLC message 575. MGW 515 responds to SBC 510 with SIP 200 OK response code 572.

Between SIP 200 OK response code 560 and SIP BYE request 563, other events may happen. Specifically, there may be two alternative possibilities 578: if the call is answered by the called party, the call flow includes the call flow of FIG. 7. If the call is not successfully set up, the call flow includes the call flow of FIG. 8.

Figure 7:
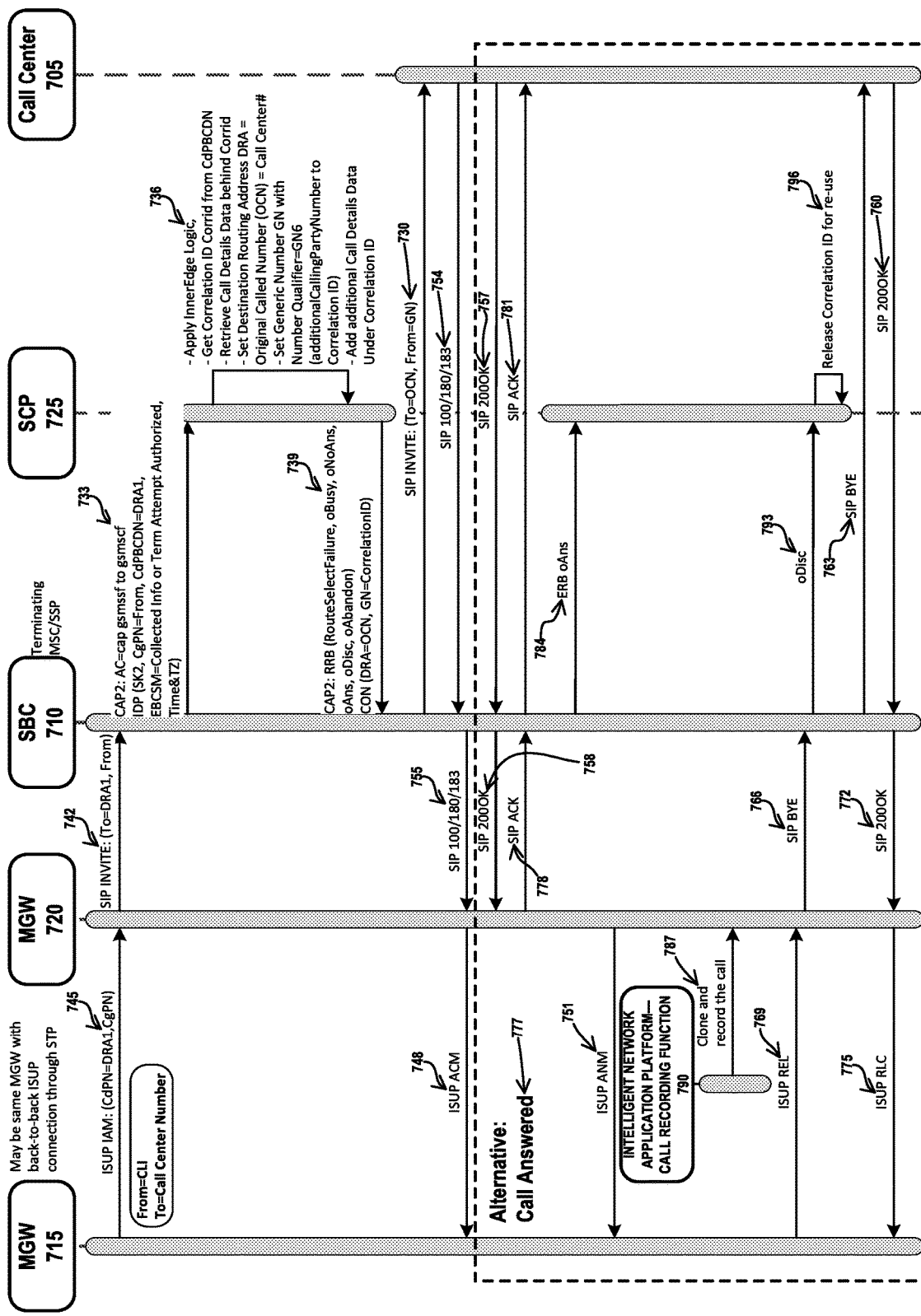
FIG. 7 is diagram illustrating a portion of a call flow according to one or more embodiments of the present invention.

FIG. 7 is diagram illustrating a portion of a call flow according to one or more embodiments of the present invention. FIG. 7 may be read in conjunction with FIG. 5 and as an alternative to FIG. 8. Specifically, FIG. 7 represents the alternative 777 wherein the call placed in FIG. 5 is answered by the called party. FIG. 7 includes MGWs 715 and 720, SBC 710, SCP 725, call center 705, and intelligent network application platform call recording function 790. MGWs 715 and 720 may be exactly the MGWs 515 and 520 as FIG. 7 illustrates one alternative 777 of a continuation of a call flow beginning in FIG. 5. MGWs 715 and 720 may be the same or similar equipment and may be implemented in the form of Cisco AS5400 Series Universal Gateway(s). MGWs 715 and 720 may have a back-to-back ISDN user part (ISUP) connection through a STP. SBC 710 may be a terminating MSC or SSP.

ISUP IAM 745 is sent from MGW 715 to MGW 720 and may be exactly ISUP IAM 545. That is, ISUP IAM 745 has as parameters DRA1 and the calling party's number. MGW 720 sends SIP INVITE request 742 to SBC 710 with a parameter of DRA1. SBC 710 sends a CAP request 733 to SCP 725. Moreover, the same SCP/SCF is receiving the same call, the first time it received the call it was instructed to treat the call with ServiceKey1 logic, the next time the SCP/SCF is contacted with that call, it should be with a request to perform different logic, e.g. SK2 . . . Where 1 and 2 are arbitrary but pre-defined between the SCF/SCPs and SSF/SSPs.

Upon receipt of CAP request 733, SCP 725 takes action 736 as follows. The correlation ID for the call is retrieved from CdPBCDN. Call details keyed to the correlation ID are retrieved. A destination routing address is set to original call number (OCN), i.e. the number of the call center. A generic number (GN) with number qualifier of GN6 is set such that the parameter additional calling party number is set to the correlation ID for the call. Additional call details data are keyed to the correlation ID and stored. SCP 725 then sends messages 739 comprising a request report BCSM (RRB) and CON to SBC 710. The RRB message 739 may include parameters such as route select failure, O_Called_Party_Busy, O_No_Answer, O_Answer, O_Disconnect, or O_Abandon. The CON message 739 may include parameters setting DRA to original called number (OCN) and GN to the correlation ID for the call.

SBC 710 sends SIP INVITE request 730 to call center 705. SIP INVITE request 730 includes parameters of OCN and GN, where the GN was set to the correlation ID for the call. Call center 705 sends SIP response codes (reference number 754) of 100, 188, or 183, as appropriate, to SBC 710, which relays the response code(s) 755 to MGW 720. MGW 720 sends the ISUP address complete message (ACM) 748 to MGW 715.

Continuing with the case 777 where the call is answered, call center 705 sends a SIP 200 OK response 757 to SBC 710, which relays the response code 758 to MGW 720. MGW 720 responds to SBC 710 with SIP ACK request 778, and SBC 710 relays the request 781 to call center 705.

SBC 710 sends detection point (DP) event report BCSM (ERB) O_Answer 784 to SCP 725. MGW 720 sends ISUP ANM 751 to MGW 715. ISUP ANM 751 may be exactly ISUP ANIVI 551.

Intelligent network application platform call recording function 790 clones and records 787 the call.

Upon receipt of SIP BYE request 566, MGW 715 sends ISUP REL message 769 to MGW 720. ISUP REL message 769 may be exactly ISUP REL 569. MGW 720 sends SIP BYE request 766 to SBC 710, which sends DP O_Disconnect 793 to SCP 725. SCP 725 releases 796 the correlation ID for the call for possible reuse. SBC 710 also sends SIP BYE request 763 to call center 705 which responds with SIP 200 OK response 760. SBC 710 sends SIP 200 OK response 772 to MGW 720, and MGW 720 sends ISUP RLC message 775 to MGW 715. ISUP RLC message 775 may be exactly ISUP RLC message 575.

Figure 8:
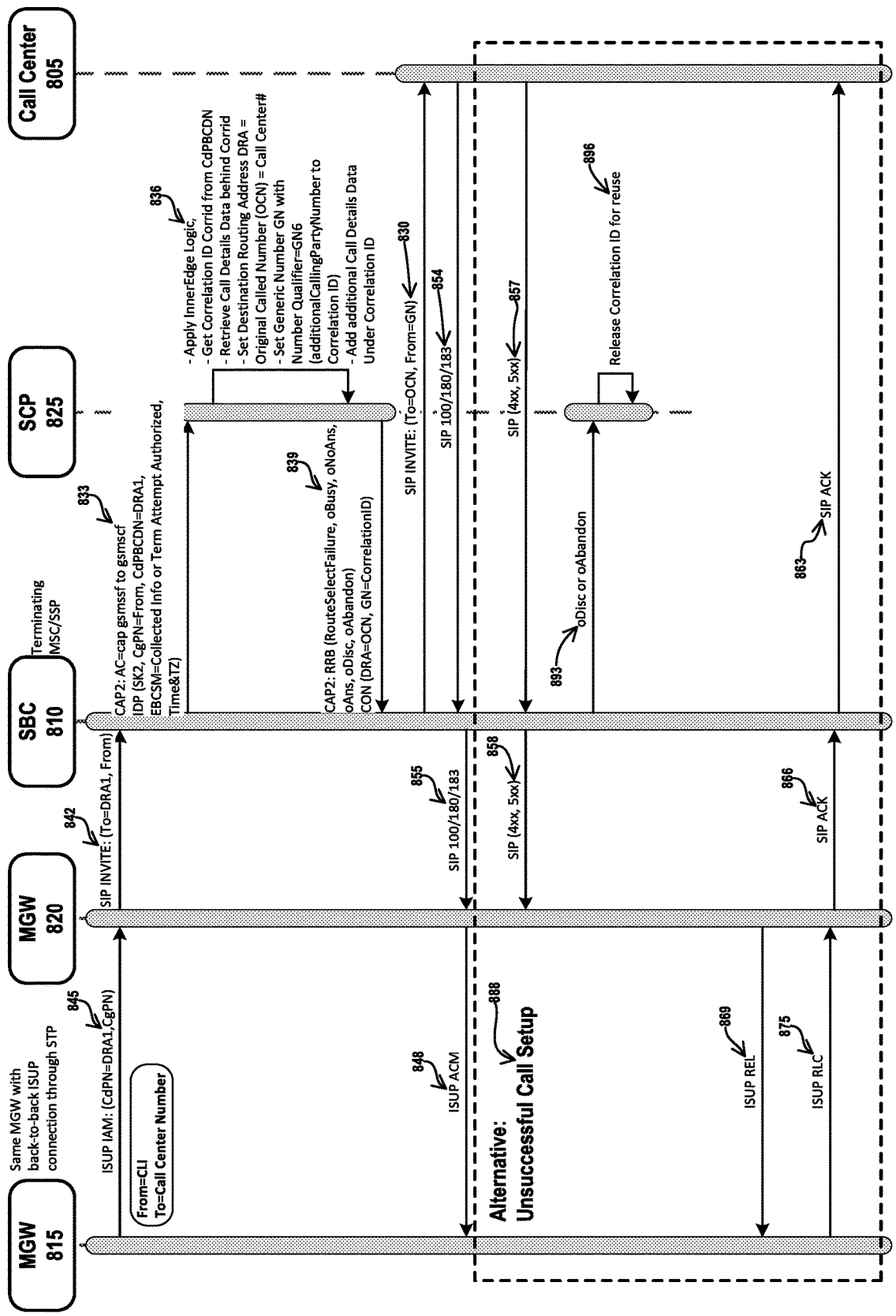
FIG. 8 is diagram illustrating a portion of a call flow according to one or more embodiments of the present invention.

FIG. 8 is diagram illustrating a portion of a call flow according to one or more embodiments of the present invention. FIG. 8 may be read in conjunction with FIG. 5 and as an alternative to FIG. 7. Specifically, FIG. 8 represents the alternative 888 wherein the call placed in FIG. 5 was not successfully set up. FIG. 8 includes MGWs 815 and 820, SBC 810, SCP 825, and call center 805. MGWs 815 and 820 may be exactly the MGWs 515 and 520 as FIG. 8 illustrates one alternative 888 of a continuation of a call flow beginning in FIG. 5. SBC 810 may be a terminating MSC or SSP.

ISUP IAM 845, SIP INVITE request 842, CAP request 833, action 836, RRB and CON messages 839, SIP INVITE request 830, SIP response codes 854, SIP response codes 855, and ISUP ACM 848 are exactly ISUP IAM 745, SIP INVITE request 742, CAP request 733, action 736, RRB and CON messages 739, SIP INVITE request 730, SIP response codes 754, SIP response codes 755, and ISUP ACM 748, respectively, except for their being part of the alternative 888 where there is an unsuccessful call setup. Accordingly, their descriptions will not be repeated.

In the case 888 where there is an unsuccessful call setup, call center 805 sends appropriate SIP response code(s) 857 from the 4xx and/or 5xx series to SBC 810, which routes SIP response codes 858 to MGW 820.

SBC 810 sends DP 893 O_Disconnect or O_Abandon to SCP 825, which then releases 896 the correlation ID assigned to the call for possible reuse.

MGW 820 sends ISUP REL message 869 to MGW 815, and MGW 815 responds to MGW 820 with ISUP RLC message 875. MGW 820 sends SIP ACK request 866 to SBC 810, which forwards SIP ACK request 863 to call center 805.

Figure 9:
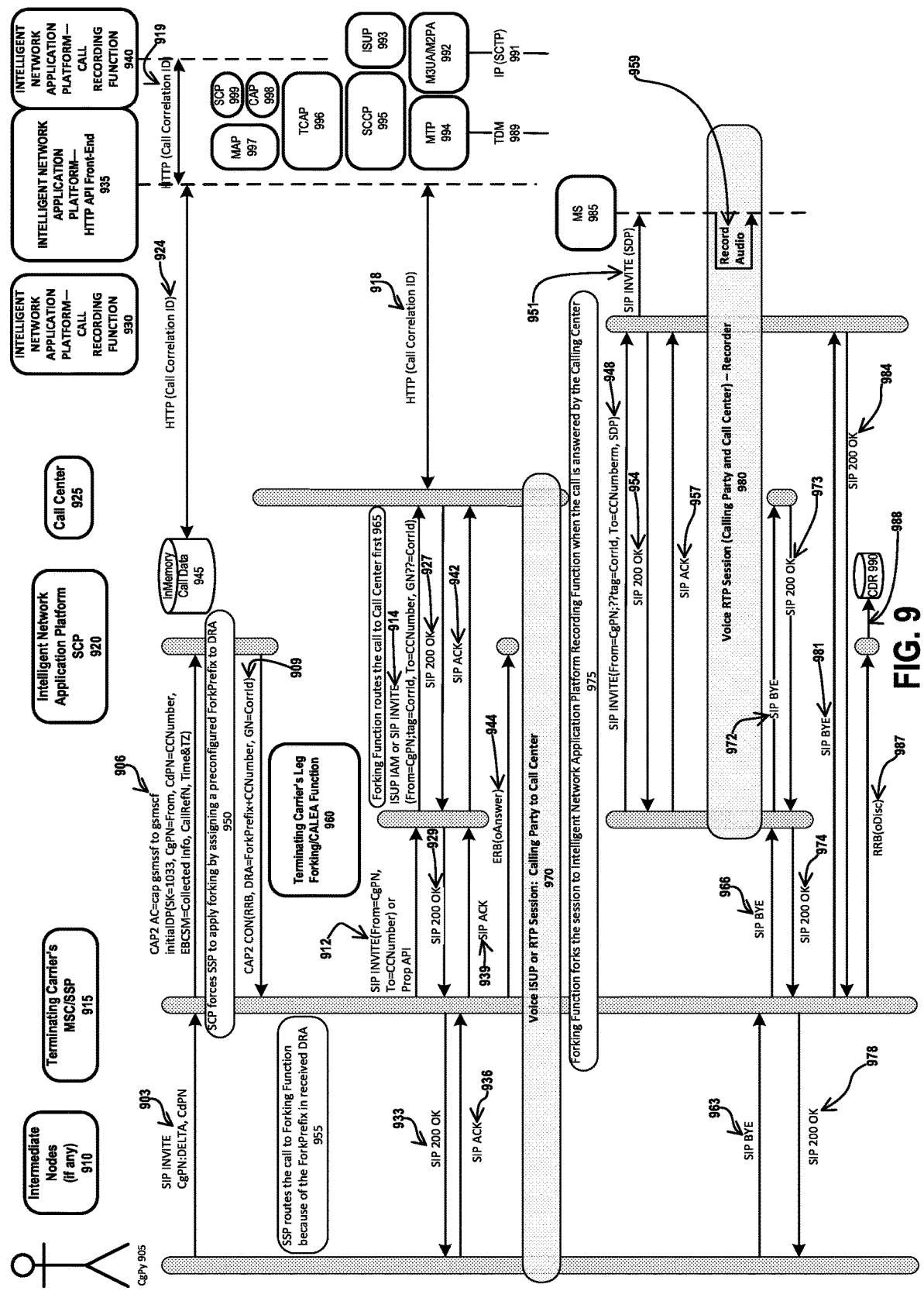
FIG. 9 is a diagram illustrating a call flow including a forking function and a call recording function according to one or more embodiments of the present invention.

FIG. 9 is a diagram illustrating a call flow including a forking function and a call recording function according to one or more embodiments of the present invention. FIG. 9 includes calling party 905, intermediate node(s) 910 (if any), the terminating carrier's MSC/SSP 915, intelligent network application platform SCP 920, call center 925, intelligent network application platform call recording function 930, intelligent network application platform hypertext transfer protocol (HTTP) application programming interface (API) front-end 935, intelligent network application platform call recording function 940, in-memory call data store 945, terminating carrier's leg forking/Communications Assistance for Law Enforcement Act (CALEA) function 960, a voice ISUP or RTP session 970 from the calling party 905 to the call center 925, A Media Server (MS) 985, a voice RTP session 980 including an audio recording 959 recorded by MS 985, and call data record store (CDR) 990.

FIG. 9 also includes a stack comprising time-division multiplexing (TDM) 989, Internet Protocol (IP) with Stream Control Transmission Protocol (SCTP) 991, Message Transfer Part (MTP) Level 3 (MTP3) User Adaptation Layer (M3UA)/MTP Part Level 2 (MTP2) User Peer-to-Peer Adaptation Layer (M2PA) 992, ISUP 993, MTP 994, Signaling Connection Control Part (SCCP) 995, Transaction Capabilities Application Part (TCAP) 996, Mobile Application Part (MAP) 997, CAMEL Application Part (CAP) 998, and SCP 999, and capabilities and interfaces for the use of the same, especially during the recording of the call and comparison of the call's correlation ID to data associated with the call's correlation ID.

Calling party's 905 phone sends SIP INVITE request 903 which is routed to the terminating carrier's MSC or SSP 915 (hereafter "MSC/SSP 915").

In the case that the calling party's 905 phone is a mobile phone, MSC/SSP 915 then sends a CAP request 906 to SCP 920 with application context (AC) gsmssf to gsmscf and initial detection point with relevant parameters. Example relevant IDP parameters may include and are not limited to the following: SK=1033, calling party number (CgPN), called party number set to the calling center's number, and EBCSM including parameters such as Collected Info, CallRefN, and time and time zone. SCP 920 responds to MSC/SSP 915 with CAP CON message 909. CON message 909 includes parameters RRB, DRA set to ForkPrefix+CCNumber (call center number), and GN set to a correlation ID for the call. The ForkPrefix is preconfigured to force MSC/SSP 915 to apply forking. The MSC/SSP 915 routes 955 the call to a Forking Function because of the ForkPrefix in the received DRA of CON message 909.

MSC/SSP 915 sends SIP INVITE request 912 to the terminating carrier's leg forking/CALEA function 960 (hereafter "forking function 960"). The forking function 960 routes 965 the call to the call center 925. Specifically, forking function 960 sends an ISUP IAM or SIP INVITE request 914 with parameters including the call's correlation ID.

Call center 925 exchanges information with intelligent network application platform HTTP API front-end 935 (hereafter "front-end 935"). This exchange of information 918 includes passing the call's correlation ID from the call center 925 to the front-end 935 and may be done using HTTP. Front-end 935 exchanges information (reference number 919), including the correlation ID for the call, with intelligent network application platform recording function 930 (hereafter "recording function 930"). Front-end 935 is also in communication with a data store 945 and may exchange information (reference number 924), including the call's correlation ID, with data store 945. Data store 945 may provide, process, and store call data in-memory and/or in real time.

Call center 925 responds to forking function 960 with response code SIP 200 OK (reference number 927). Forking function 960 sends response code SIP 200 OK (reference number 929) to MSC/SSP 915, which forwards the response code 933 to the calling party. A SIP ACK request 936 is sent from the calling party 905 to MSC/SSP 915, from MSC/SSP 915 to forking function 960 (reference number 939), and from forking function 960 to call center 925 (reference number 942). MSC/SSP 915 sends detection point ERB O_Answer 944 to SCP 920. A voice ISUP or RTP session 970 from the calling party 905 to the call center 925 begins.

The forking function 960 forks 975 the session to recording function 930. Forking function 960 sends a SIP INVITE request 948 with parameters including the correlation ID for the call and SDP (SIP Description Protocol—which defines the negotiation between two parties sharing media). Recording function 930 sends a SIP INVITE request 951 with parameter of SDP to MS 985. Recording function 930 responds to forking function 960 with response code SIP 200 OK (reference number 954). Forking function 960 sends SIP ACK request 957 to recording function 930. Voice RTP session 980 including the call between the calling party 905 and call center 925 begins, and the audio is recorded 959 by MS 985.

When the calling party 905 ends the call, a SIP BYE request 963 is sent from the calling party to the MSC/SSP 915. The MSC/SSP 915 sends the SIP BYE request 966 to the forking function 960, which in turn sends the SIP BYE request 972 to the call center 925. The call center 925 responds to the forking function 960 with response code SIP 200 OK (reference number 973), and the forking function 960 sends response code SIP 200 OK (reference number 974) to MSC/SSP 915. MSC/SSP 915 sends response code SIP 200 OK to calling party 905 (reference number 978). MSC/SSP 915 sends request SIP BYE 981 to the call center 925, which responds with response code SIP 200 OK (reference number 984). MSC/SSP 915 sends RRB message O_Disconnect 987 to SCP 920, and SCP 920 then provides 988 a call detail record (CDR) concerning the call to data store 990. The CDR may be used for the purposes of an audit trail, historical usage patterns, billing records, and performance metrics.

Figure 10:
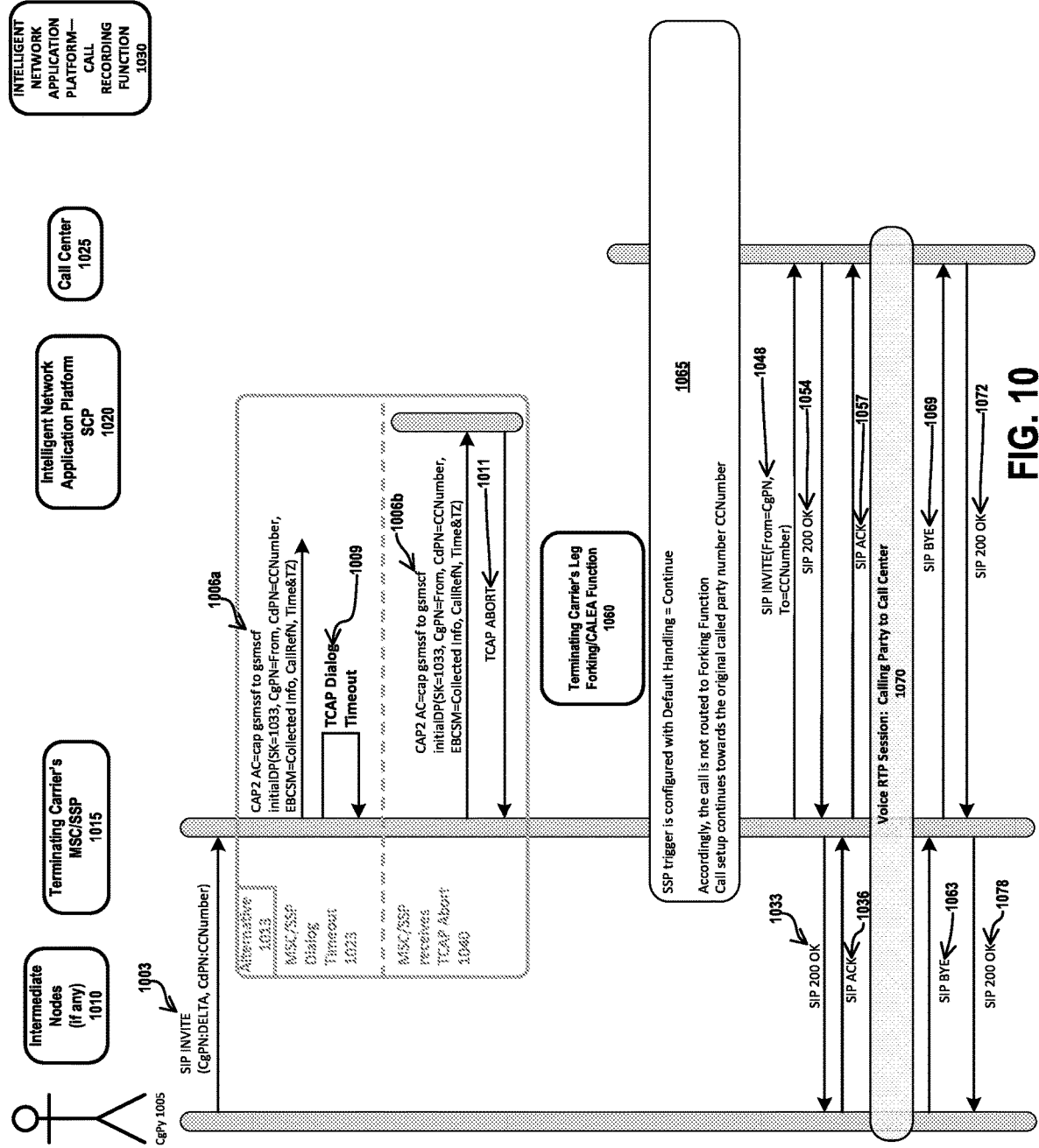
FIG. 10 is a diagram illustrating a call flow wherein the call is not routed to a forking function according to one or more embodiments of the present invention.

FIG. 10 is a diagram illustrating a call flow wherein the call is not routed to a forking function according to one or more embodiments of the present invention. FIG. 10 includes calling party 1005, intermediate node(s) 1010 (if any), the terminating carrier's MSC/SSP 1015 (hereafter "MSC/SSP 1015"), intelligent network application platform SCP 1020, call center 1025, intelligent network application platform call recording function 1030, terminating carrier's leg forking/CALEA function 1060 (hereafter "forking function 1060"), and a voice RTP session 1070 from the calling party 1005 to the call center 1025.

Calling party's 1005 phone sends a SIP INVITE request 1003 which eventually reaches MSC/SSP 1015. At this time, in the case where the call is not routed to a forking function, at least two alternative 1013 possibilities exist which comprise the following: alternative 1023 wherein MSC/SSP 1015 has a timeout dialog or alternative 1040 wherein MSC/SSP 1015 receives a TCAP Abort primitive 1011.

Alternative 1023 begins with CAP request 1006a, and alternative 1040 begins with CAP request 1006b. CAP requests 1006a and 1006b are identical and are sent to SCP 1020. CAP requests 1006a and 1006b may be substantially the same as CAP request 906. In alternative 1023, a TCAP dialog timeout 1009 is realized. In alternative 1040, SCP 1020 responds to CAP request 1006b with TCAP ABORT primitive 1011.

MSC/SSP 1015 may have a trigger with default handling set to continue after one of the possibilities in alternative 1013 occurs. Accordingly, the call is not routed to forking function 1060, and call setup continues toward the original called party number CCNumber. (Reference number 1065.)

MSC/SSP 1015 sends a SIP INVITE request 1048 to call center 1025, which responds to MSC/SSP 1015 with response code SIP 200 OK (reference number 1054). MSC/SSP 1015 sends response code SIP 200 OK (reference number 1033) to calling party's 1005 phone, which responds to MSC/SSP 1015 with SIP ACK request 1036. MSC/SSP 1015 sends SIP ACK request 1057 to call center 1025. Voice RTP session 1070 from calling party 1005 to call center 1025 begins. At the conclusion of the call, calling party's 1005 phone sends a SIP BYE request 1063 that reaches MSC/SSP 1015, and MSC/SSP 1015 sends a SIP BYE request 1069 to call center 1025. Call center 1025 sends response code SIP 200 OK (reference number 1072) to MSC/SSP 1015, which forwards response code SIP 200 OK (reference number 1078) to calling party's 1005 phone.

Figure 6:
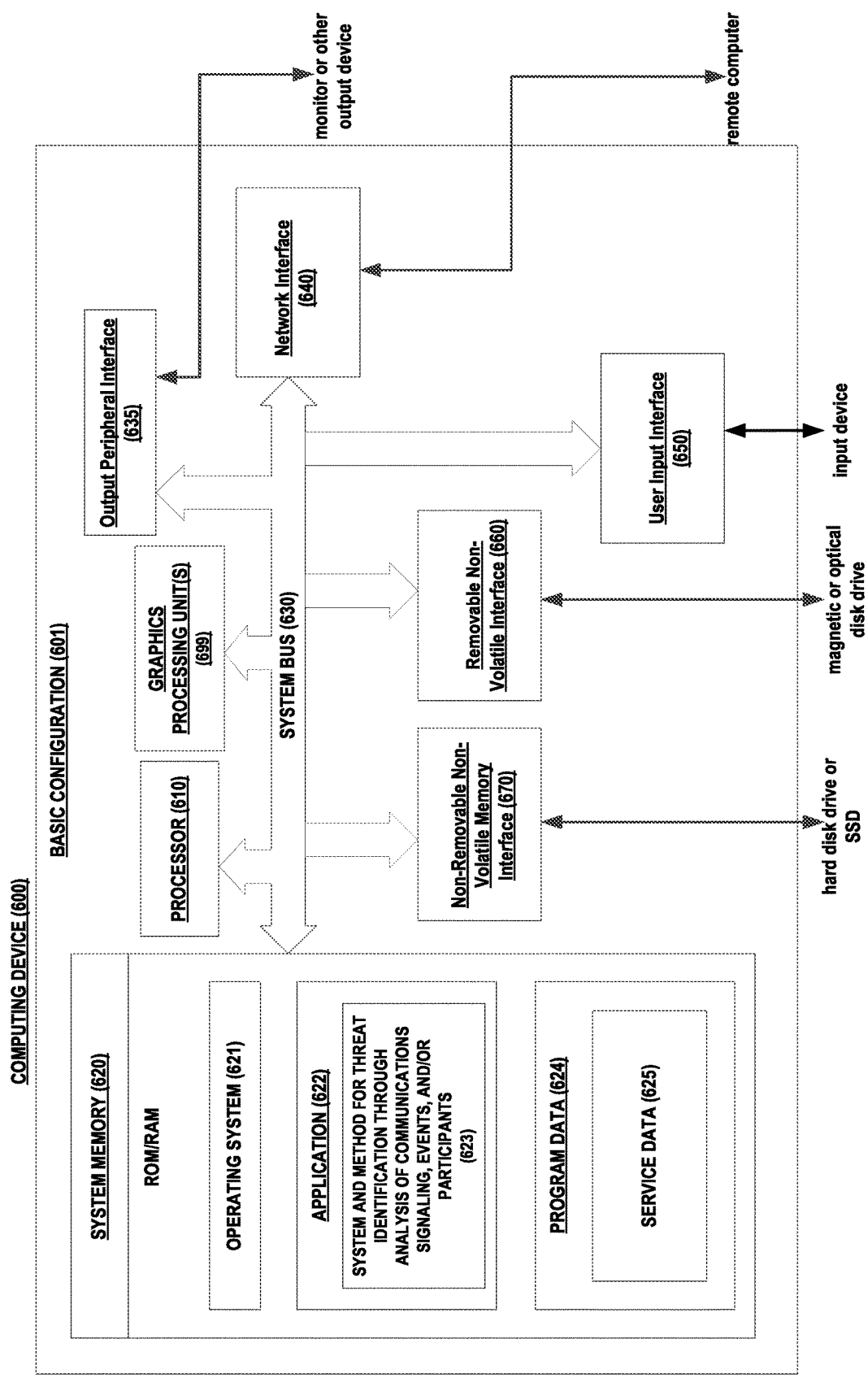
FIG. 6 is a block diagram illustrating an example computing device that may be utilized to implement part of various inventive embodiments.

The intelligent network application platform 250, secure next generation network facilities 320, intelligent network application platform 435 may be further implemented with one or more processors and a memory device. FIG. 6 is a more detailed example of such hardware implementation details.

FIG. 6 is a high-level block diagram of an example computer (600) that is arranged for identifying threats through analysis of communications signaling, events, and/or participants. The computer (600) may be used to further implement intelligent network application platform 250, secure next generation network facilities 320, and intelligent network application platform 435 embodiments of the invention which may be collectively and individually referred to herein as a "network application platform" or "telecommunications network application platform".

In a very basic configuration (601), the computing device (600) typically includes one or more processors (610) and system memory (620). A system bus (630) can be used for communicating between the processor (610) and the system memory (620).

Depending on the desired configuration, the processor (610) can be of any type including but not limited to a microprocessor (μP), a microcontroller (μC), a digital signal processor (DSP), or any combination thereof. The processor (610) can include one more levels of caching, a processor core, and registers. The processor core can include an arithmetic logic unit (ALU), a floating point unit (FPU), a digital signal processing core (DSP Core), or any combination thereof. A memory controller can also be used with the processor (610), or in some implementations the memory controller can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a system and method for identifying threats through analysis of communications signaling, events, and/or participants as described above in relation to FIGS. 3, 4, 5, 7, 8, 9, 10, and 11a-c. Program Data (624) includes storing instructions that, when executed by the one or more processing devices, implement a system and method for identifying threats through analysis of communications signaling, events, and/or participants (623). In some embodiments, the application (622) can be arranged to operate with program data (624) on an operating system (621). Program data (624) includes service data (625). Service data (625) represents data particular to the instance to be processed, e.g. uninitialized variables, which may include arguments to parameters for methods appropriate to implement the systems and methods described herein.

The computing device (600) can have additional features or functionality, and additional interfaces to facilitate communications between the basic configuration (601) and any required devices and interfaces, such non-removable non-volatile memory interface (670), removable non-volatile interface (660), user input interface (650), network interface (640), and output peripheral interface (635). A hard disk drive or solid state drive (SSD) may be connected to the system bus (630) through a non-removable non-volatile memory interface (670). A magnetic or optical disk drive may be connected to the system bus (630) by the removable non-volatile interface (660). A user of the computing device (600) may interact with the computing device (600) through input devices such as a keyboard, mouse, or other input peripheral connected through a user input interface (650). A monitor, printer, speaker or other output peripheral device may be connected to the computing device (600) through an output peripheral interface (635) in order to provide output from the computing device (600) to a user or another device.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device (600). Any such computer storage media can be part of the device (400). One or more graphics processing units (GPUs) (699) may be connected to the system bus (630) to provide computing capability in coordination with the processor (610), especially where single instruction, multiple data (SIMD) problems are present.

The computing device (600) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations. Additionally, the computing device (600) may operate in a networked environment where it is connected to one or more remote computers over a network using the network interface (650).

Figure 11A:
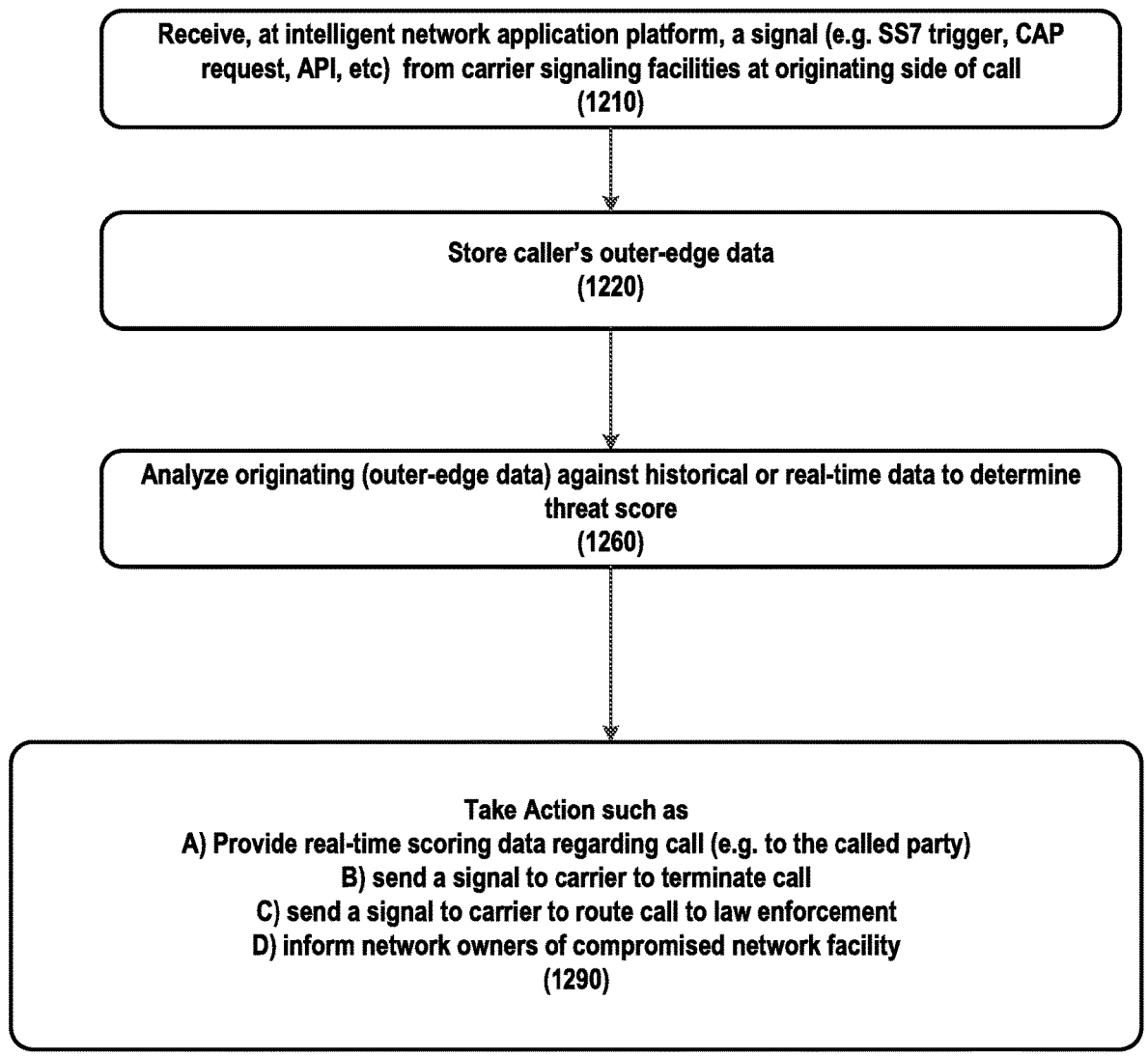
FIGS. 11a, 11b, 11c and 11d are block diagrams illustrating methods for threat identification through analysis of communications signaling, events, and/or participants according to embodiments of the present invention.

FIG. 11a is a block diagram illustrating a method for threat identification through analysis of communications signaling, events, and/or participants according to one or more embodiments of the present invention. The methods of FIG. 11a are performed by and from the perspective of any of the intelligent network application platform 250, secure next generation network facilities 320, or intelligent network application platform 435 which may be collectively referred to herein as "intelligent network application platform".

First, an intelligent network application platform receives a signal (e.g. a SS7 request or MAP request or CAP request or API request) from the carrier signaling facilities at the originating side of the call (1210). The intelligent network application platform then stores the caller's outer-edge data (1220). Next, the intelligent network application platform analyzes the originating (from carrier facilities at the originating side of the call) outer edge data against historical or real time outer edge data to determine a threat score (1260). It is noted that "threat score" may be a single number indicating a degree of potential threat posed by the call but, in practice, the threat score encompasses an ensemble of parameters. This ensemble of parameters may include negative, positive, or neutral results of each of the points of analysis, such as network match, proximity match, time of day, social activity, multi-factor authentication, and other such items available now and in the future to corroborate the participants on the call.

Furthermore, the methods of determining threat score (1260, 1262, 1264, and 1266 in FIGS. 11*a-d*), in and of itself, and known, conventional processes and all known and future developed threat score calculations are within the scope of the various inventions disclosed herein. Non-limiting examples of such conventional threat score calculation processes include determining the route that the call took to arrive at the monitored point in the call setup via point-codes, comparing the originating line type to the phone number type, comparing the p-asserted identity to the user provided calling party phone number, comparing the location of call origination to the current location of the phone number, comparing the calling party's phone number to public and private lists and systems for complaints, known telemarketers/robocallers, known call states, and known fake/unassigned numbers. Aspects of the present inventions greatly improve such threat score calculations by leveraging call signaling which provides a richer collection of and more reliable data for use in such threat score calculations.

Thereafter intelligent network application platform may take one or more actions (1290) such as providing real-time scoring data regarding the call to the called party, sending a signal to the carrier to terminate the call, send a signal to the carrier to route the call to law enforcement or otherwise notify law enforcement about the high threat score call, and/or inform network owners of potentially compromise network facilities. The actions may also include dynamic or pre-determined actions such as redirecting the telephone call to a new destination, such as high-skill agent, an IVR/VRU system for automated authentication, or voicemail; splitting off the audio to a recording, monitoring, or listening facility; and/or hanging-up on the caller.

Figure 11B:
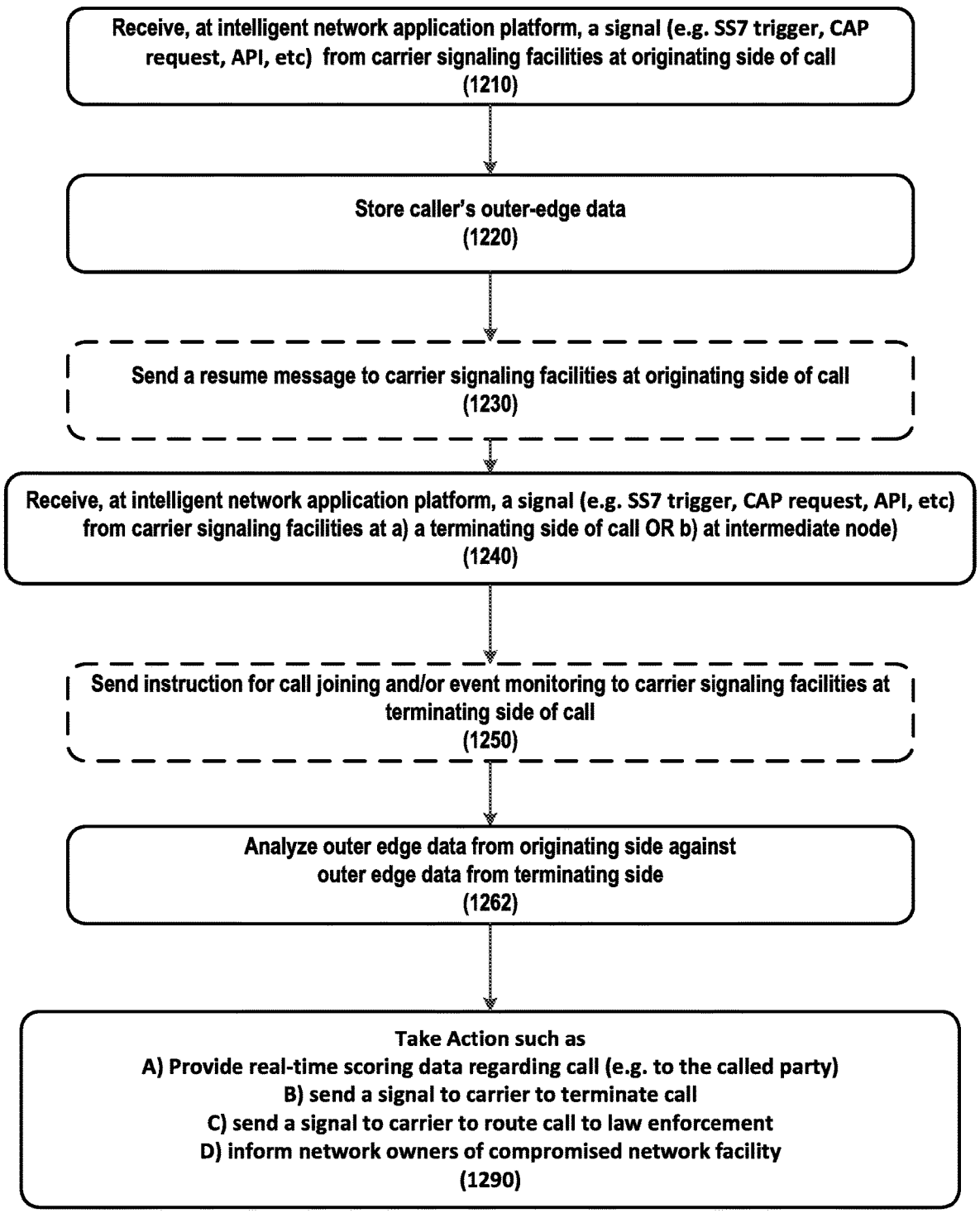
Figure 11C:
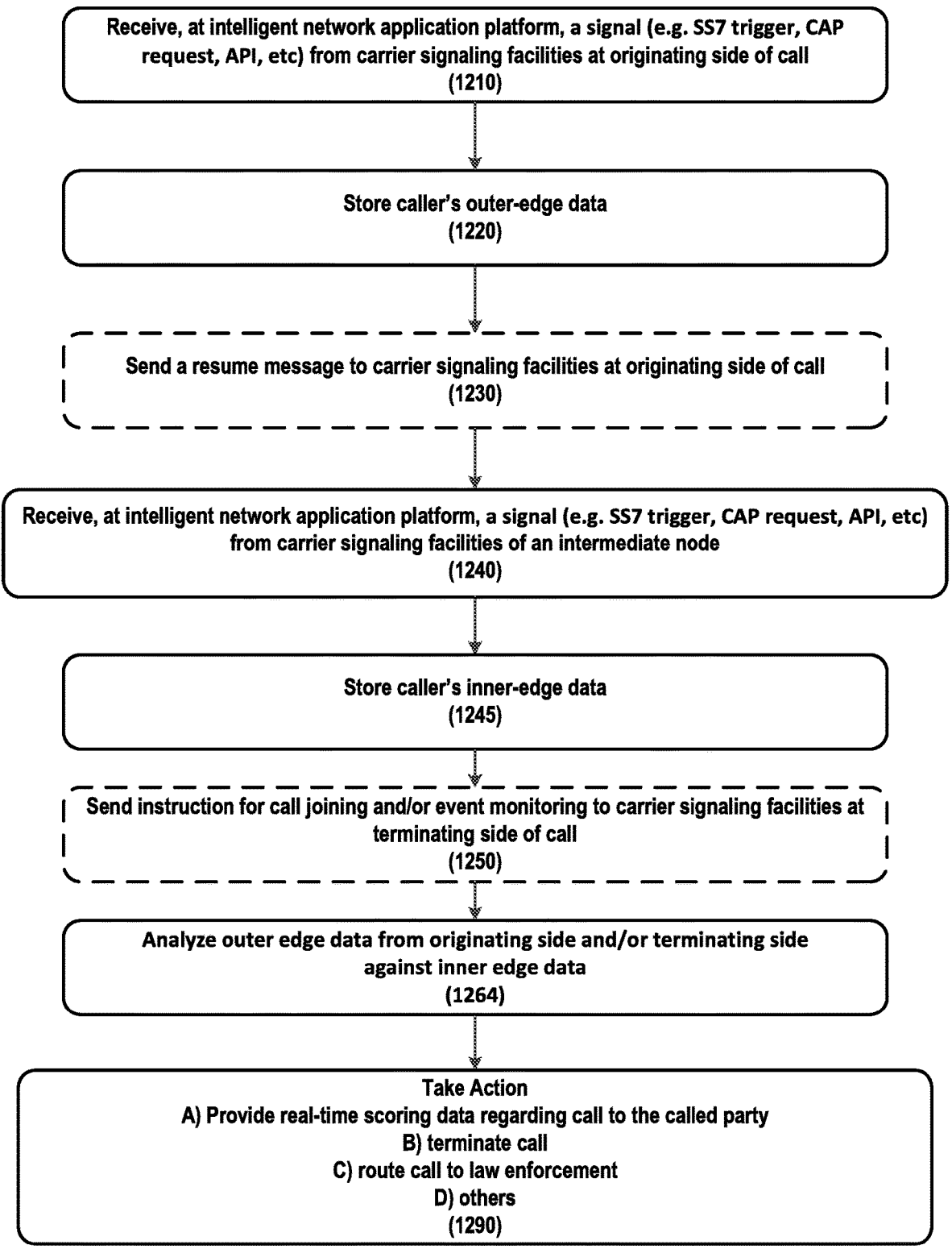

FIG. 11*b* illustrates, for example, a case in which a call has been placed by phone 310 to carrier facilities 315 and the call has been received by an enterprise customer call center 355 or other node (terminal or intermediate). In addition to steps 1210, 1220, 1290 which are described above the following additional steps may be performed. One optional step is the intelligent network application platform sending a resume message to the carrier signaling facilities at the originating side of the call (1230). The intelligent network application platform also receives a signal (e.g. SS7 request or MAP request or CAP request or API request) from the carrier signaling facilities at the terminating side of the call (1240). The intelligent network application platform may optionally send an instruction for call joining and/or event monitoring to the carrier signaling facilities at the terminating side of the call (1250). Next, the intelligent network application platform compares or otherwise analyzes the originating (from carrier facilities at the originating side of the call) outer edge data against the terminating-side outer edge data (1262) to determine a threat score (1262). Due to the data vulnerability within the communications network such outer edge data may be changed or otherwise compromised in some way. Thus, by analyzing the outer edge data from the originating side before malicious entities can change the outer edge data against the outer edge data from the terminating side one can detect any such changes or data compromises. It is further noted that this comparison/analysis (1262) may be performed using outer edge data from an intermediate node (e.g. carrier facilities 335 in FIG. 3) and/or terminating node (e.g. enterprise customer call canter 355). FIG. 11*c* illustrates, for example, a case in which a call has been placed by phone 310 to carrier facilities 315 and the call has been received by an enterprise customer call center 355 or other node (terminal or intermediate). In addition to steps 1210, 1220, 1230, 1290 which are described above the following additional steps may be performed.

FIG. 11*c* adds inner edge data capture, storage and analysis. Inner edge data may be collected from intermediate nodes. Inner edge data may include new data in combination or as a replacement to the outer edge data as well as any intermediate nodes that participated between the outer edge and the monitored inner edge. The accompanying outer edge or previous-participating-node data may be the exact, abstracted/translated, or different information that the respective data available in the outer edge and previous-node data. For example, the cell-id from which a mobile originated phone call may be available as the raw identifier (number) in the outer edge data, but the respective data in the inner edge data may have been transformed by an intermediary node to be the zipcode of where that cell-id resides or is closest to. Similarly intermediate-nodes may inject their own data or routing decisions, such as call forwarding, that results in the original called party data from the outer edge data to be included in a new field (e.g. original-called-party-number) and the intermediary-node-modified value for called-party-number being the forwarded-to number. For the inventive this variance is both expected to be possible and useful when it does and doesn't happen because aspects of the invention can use the relative statistical inconsistencies to help identify potential unexpected participants in a future call. FIG. 11*c* adds a receive step 1240 that receives, at the intelligent network application platform, a signal (e.g. SS7 request or MAP request or CAP request or API request) from the carrier signaling facilities of an intermediate node. In response, inner edge data is stored (1245). It is noted that multiple requests to multiple, different intermediate nodes (e.g. a loop of steps 1240 and 1245) may be used to capture and store inner edge data from multiple intermediate nodes. Next, the intelligent network application platform compares or otherwise analyzes the originating (from carrier facilities at the originating side of the call and/or at a terminating side of the call) outer edge data against inner edge data (of one or more intermediate nodes) to determine a threat score (1264).

Figure 11D:
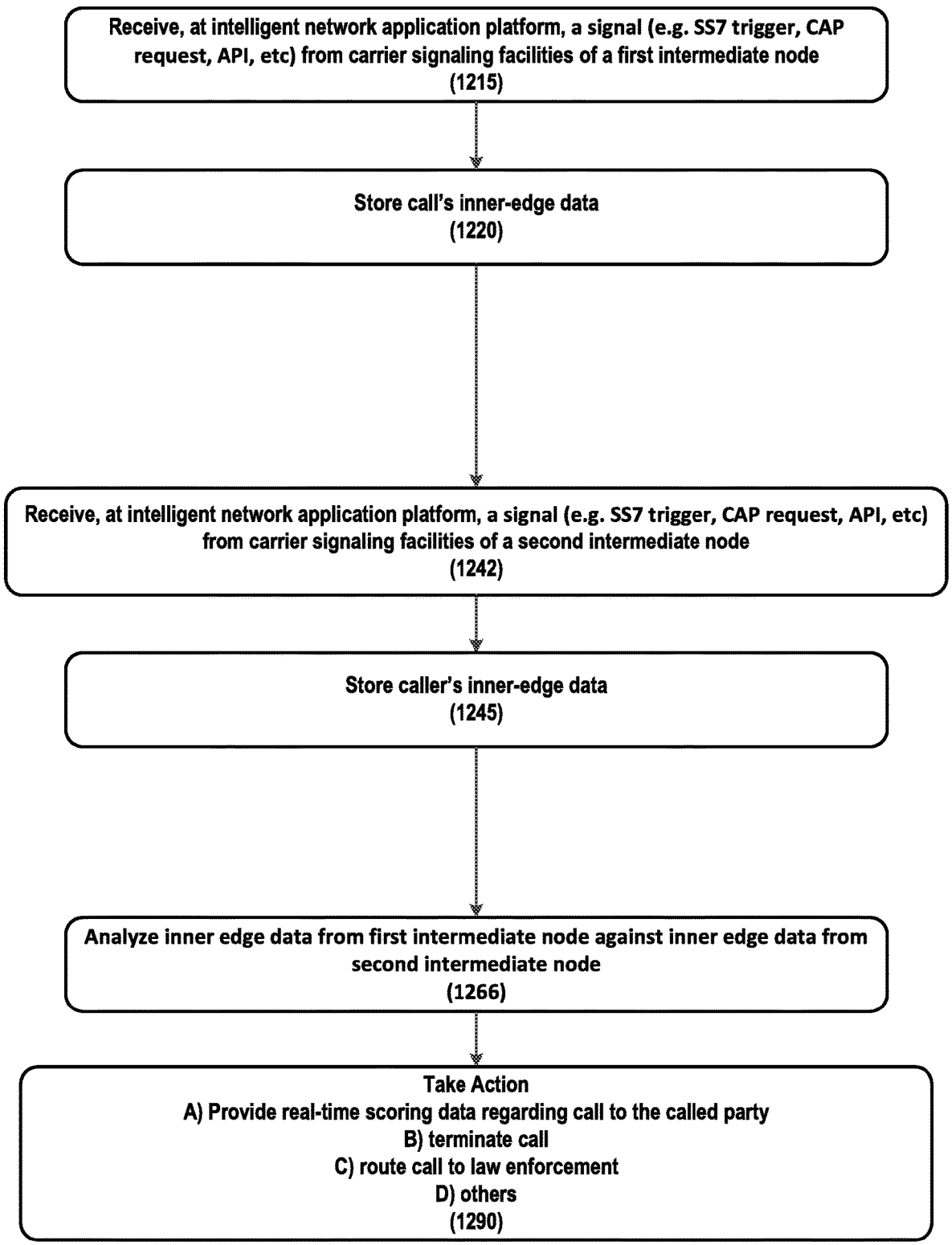

FIG. 11*d* leverages inner edge data capture, storage and analysis at multiple intermediate nodes. First, an intelligent network application platform receives a signal (e.g. a SS7 request or MAP request or CAP request or API request) from the carrier signaling facilities of a first intermediate node (1215). The intelligent network application platform then stores the call's inner-edge data (1220) from that first intermediate node. The intelligent network application platform may then receive another signal (e.g. a SS7 request or MAP request or CAP request or API request) from the carrier signaling facilities of a second intermediate node (1242). The intelligent network application platform then stores the call's inner-edge data (1245) from that second intermediate node. It is noted aspect of the invention may conduct additional capture and storage of inner edge data from other ($3^{rd}$, $4^{th}$, . . . nth) intermediate nodes. The intelligent network application platform may then compares or otherwise analyzes the inner edge data from the first intermediate node against inner edge data (of one or more other intermediate nodes) to determine a threat score (1266).

Figure 12:
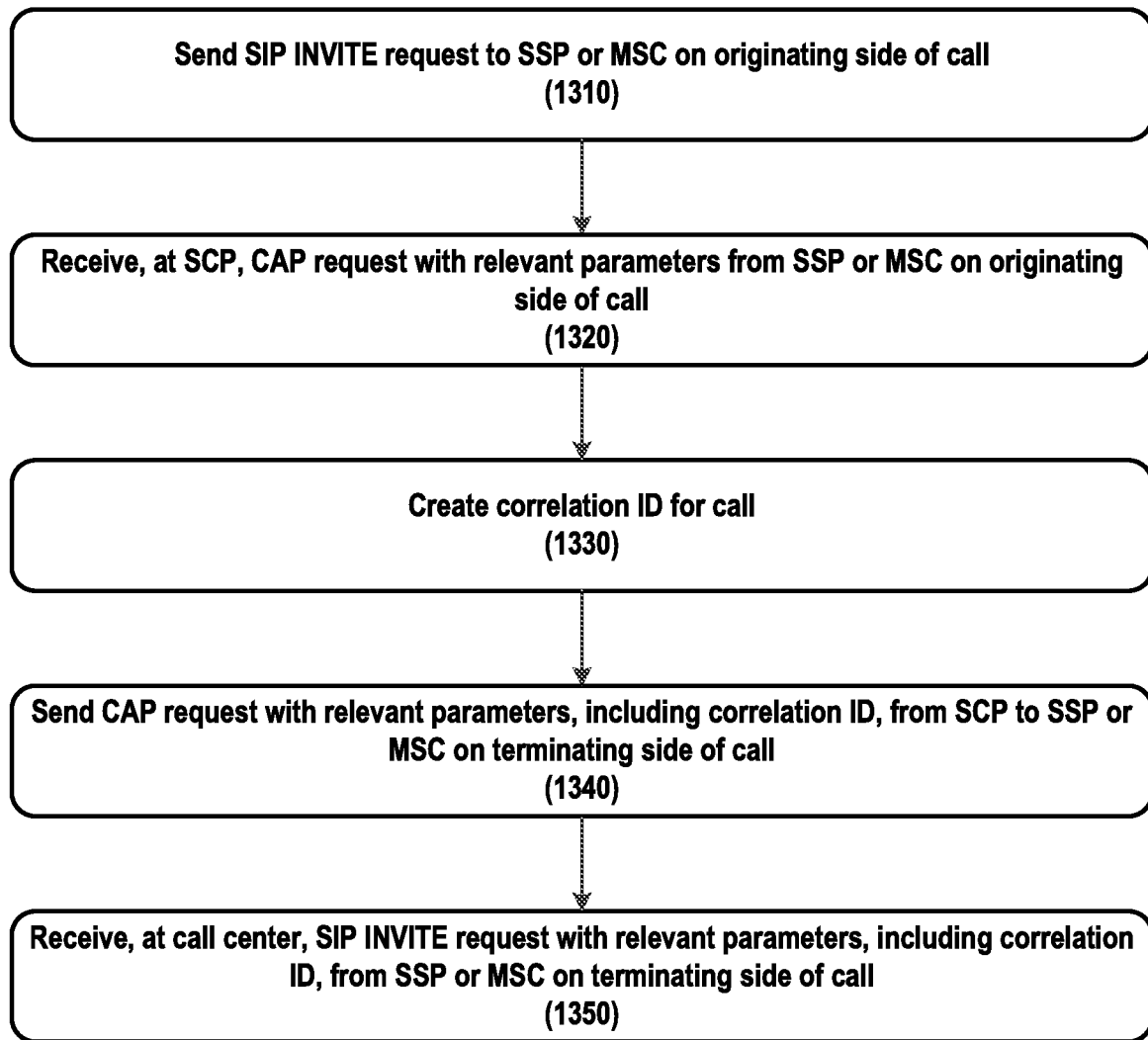
FIG. 12 is a block diagram illustrating a method for tagging a call with a correlation identifier at both the originating and terminating ends of the call according to one or more embodiments of the present invention.

FIG. 12 is a block diagram illustrating a method for tagging a call with a correlation identifier at both the originating and terminating ends of the call according to one or more embodiments of the present invention. First, the calling party's phone sends a SIP INVITE request to the SSP or MSC on the originating side of the call (1310). Second, a SCP which is part of the intelligent network application platform receives a CAP request with relevant parameters from the SSP or MSC at the originating side of the call (1320). Third, the intelligent network application platform creates a correlation ID for the call (1330). Fourth, a SCP which is part of the intelligent network application platform sends a CAP request with relevant parameters, including the correlation ID for the call, to the SSP or MSC on the terminating side of the call (1340). Fifth, a call center receives a SIP INVITE request with relevant parameters, including the correlation ID for the call, from the SSP or MSC on the terminating side of the call (1350).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for analyzing call signaling data, the method comprising:

obtaining, by a computer from one or more databases, prior signaling data associated with one or more prior calling devices for a plurality of prior calls, the prior signaling data associated with the prior calling device including a device identifier of the prior calling device;

receiving, by the computer from an originating carrier, inbound signaling data associated with an inbound calling device that originated an inbound call traversing a telecommunications network and not in the plurality of prior calls, the inbound signaling data including the device identifier associated with the inbound calling device;

generating, by the computer, statistical information using the prior signaling data associated with the prior calling device having the device identifier matching the device identifier of the inbound calling device;

identifying, by the computer, one or more outliers in the inbound signaling data based upon the statistical information generated for the prior calling device having the device identifier of the inbound calling device;

generating, by the computer, a threat score for the inbound phone call based at least in part upon the one or more outliers indicating a difference between the inbound signaling data and the statistical information generated using the prior signaling data; and transmitting, by the computer, instructions to one or more carriers to direct the inbound phone call based upon the threat score.

2. The method according to claim 1, wherein a carrier is at least one of the originating carrier and an intermediate carrier.

3. The method according to claim 1, wherein the prior signaling data for the prior call further includes prior line information for associated with the prior calling device, and wherein the threat score is further based upon one or more differences between the inbound signaling data and the prior signaling data of at least one prior call.

4. The method according to claim 1, wherein the one or more databases includes a database of a terminating carrier, and wherein the method further comprises:

receiving, by the computer from the database of the terminating carrier, the prior signaling data of the prior calling device having the device identifier matched to the inbound calling device, wherein the threat score is further based upon one or more differences between the inbound signaling data received from the originating carrier and the prior signaling data received from the terminating carrier.

5. The method according to claim 1, wherein at least one database of the one or more databases includes a database of a carrier system.

6. The method according to claim 1, wherein at least one database of the one or more databases includes a database of a third-party non-carrier system.

7. The method according to claim 1, wherein an outlier includes at least one of: a time of the inbound call, one or more instances of repeat calling, a location anomaly, or an ownership status.

8. The method according to claim 1, wherein the device identifier includes at least one of: a subscriber identifier, an equipment identifier, or a subscriber identification module (SIM) card.

9. The method according to claim 1, further comprising determining, by the computer, whether the threat score for the inbound call satisfies an authentication threshold.

10. The method according to claim 9, further comprising authenticating, by the computer, the inbound calling device in response to determining that the threat score satisfies the authentication threshold.

11. The method according to claim 9, further comprising executing, by the computer, one or more remedial actions in response to determining that the threat score fails to satisfy the authentication threshold.

12. A computer-implemented method for analyzing call signaling data, the method comprising:
receiving, by a computer of a network platform associated with an intermediate network system, inbound signaling data associated with an inbound calling device for an inbound call from an originating carrier;
obtaining, by the computer, expected signaling data associated with the inbound calling device from one or more databases of one or more network carrier systems;
determining, by the computer, an amount of variance between the expected signaling data and the inbound signaling data for the inbound calling device, wherein the computer determines the level of variance based upon the expected signaling data received from a terminating carrier and the inbound signaling data from the originating carrier;
generating, by the computer, a threat score for the inbound call based at least in part upon the amount of variance between the inbound signaling data and the expected signaling data obtained from the one or more databases of the one or more network carrier systems; and
responsive to determining that the threat score for the inbound call fails satisfy an authentication threshold, executing, by the computer, one or more remedial actions.

13. The method according to claim 12, wherein obtaining the expected signaling data includes:
generating, by the computer, statistical information for the expected signaling data based upon prior signaling data associated with one or more prior calling devices,
wherein the computer determines the amount of variance between the expected signaling data and the inbound signaling data for the inbound calling device using the statistical information.

14. The method according to claim 12, wherein obtaining the expected signaling data includes:
identifying, by the computer, one or more types of data fields in the expected signaling data, the one or more types of data fields associated with one or more intermediate carriers,
wherein the computer determines the amount of variance based upon the one or more types of data fields in the expected signaling data and the one or more types of data fields in the inbound signaling data.

15. The method according to claim 12, wherein a database of a network carrier system includes at least one of: the database of an intermediate carrier, the database of the originating carrier, or the database of the terminating carrier.

16. The method according to claim 12, wherein the computer further obtains at least a portion of the expected signaling data associated with the inbound calling device from a database of a third-party non-carrier system.

17. The method according to claim 16, further comprising transmitting, by the computer, a request for the expected signaling data associated with the inbound calling device to the third-party non-carrier system, wherein the request includes a device identifier associated with the inbound calling device received in the inbound signaling data.

18. The method according to claim 12, wherein the inbound signaling data includes at least one of: a device identifier associated with the inbound calling device or inbound line information associated with the inbound calling device.

19. The method according to claim 12, wherein a remedial action of the one or more remedial actions includes at least one of: dropping the inbound call, routing the inbound call for isolation, or transmitting a notification to one or more devices of the one or more network carrier systems.

20. The method according to claim 12, wherein the computer determines the level of variance between the expected signaling data received from the terminating carrier having a comparatively higher-level trust and the inbound signaling data from the originating carrier having a comparatively lower-level trust.

* * * * *